United States Patent [19]

Gladstone et al.

[11] 4,123,751

[45] Oct. 31, 1978

[54] ELECTRONIC DISPLAY APPARATUS INCLUDING A DC-RESPONSIVE ELECTRO-LUMINESCENT PHOSPHOR SCREEN

[75] Inventors: David J. Gladstone, Ilford; Peter A. Moldram, Aylesbury, both of England

[73] Assignee: The Post Office, London, England

[21] Appl. No.: 673,697

[22] Filed: Apr. 5, 1976

[30] Foreign Application Priority Data

Apr. 8, 1975 [GB] United Kingdom ............... 14424/75

[51] Int. Cl.² ................................................ G06F 3/14

[52] U.S. Cl. ......................... 340/324 M; 340/166 EL; 315/169 R

[58] Field of Search .................... 340/166 EL, 324 M; 350/160 R; 315/169 R, 169 TV

[56] References Cited

U.S. PATENT DOCUMENTS

| | | | |
|---|---|---|---|
| 2,932,770 | 4/1960 | Livingston .................... | 340/166 EL |
| 3,824,580 | 7/1974 | Bringol ............................ | 340/324 M |
| 3,976,362 | 8/1976 | Kawakami ....................... | 340/324 M |

*Primary Examiner*—Marshall M. Curtis

*Attorney, Agent, or Firm*—Hall & Houghton

[57] ABSTRACT

Drive circuits for a flat panel display using a matrix of DC responsive phosphor dots are disclosed. Enabled row conductors receive a pulse of DC potential equal to +HV, whereas disabled row conductors receive $+HV/_2$. Enabled column conductors receive zero potential, whereas disabled column conductors receive $+HV/_2$. HV is in the range 90 to 140V. This allows semiconductor integrated circuit display drivers to be used in conjunction with the column conductors. Discrete transistor complementary-pair drivers are used for the row conductors. Scanning and character generation functions are achieved by the use of semiconductor integrated circuits. A pulse-width brightness control operates by selection of one of several logical combinations of the outputs of a counter. Two or four column driver circuits are provided to simplify high density connection problems and a divider circuit causes the column driver circuits to be addressed in sequence. Physical connection to the column drivers is made alternately from the top and bottom of the matrix.

17 Claims, 23 Drawing Figures

Figure 1:
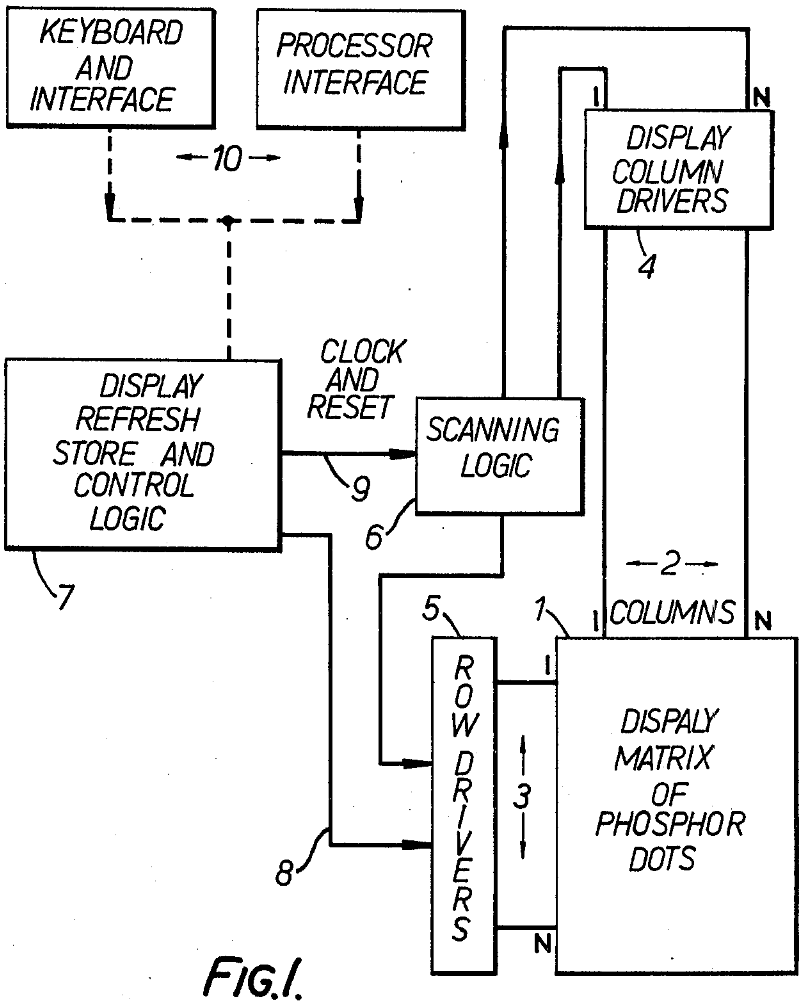

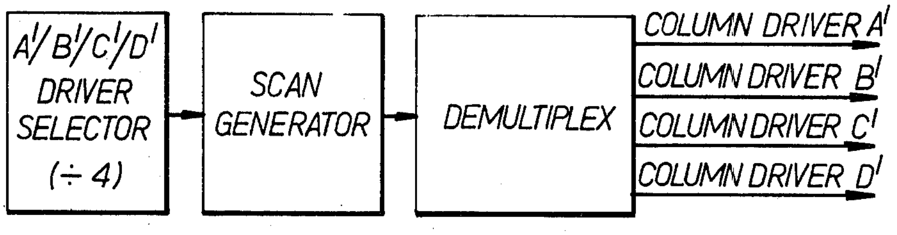
FIG. 15.
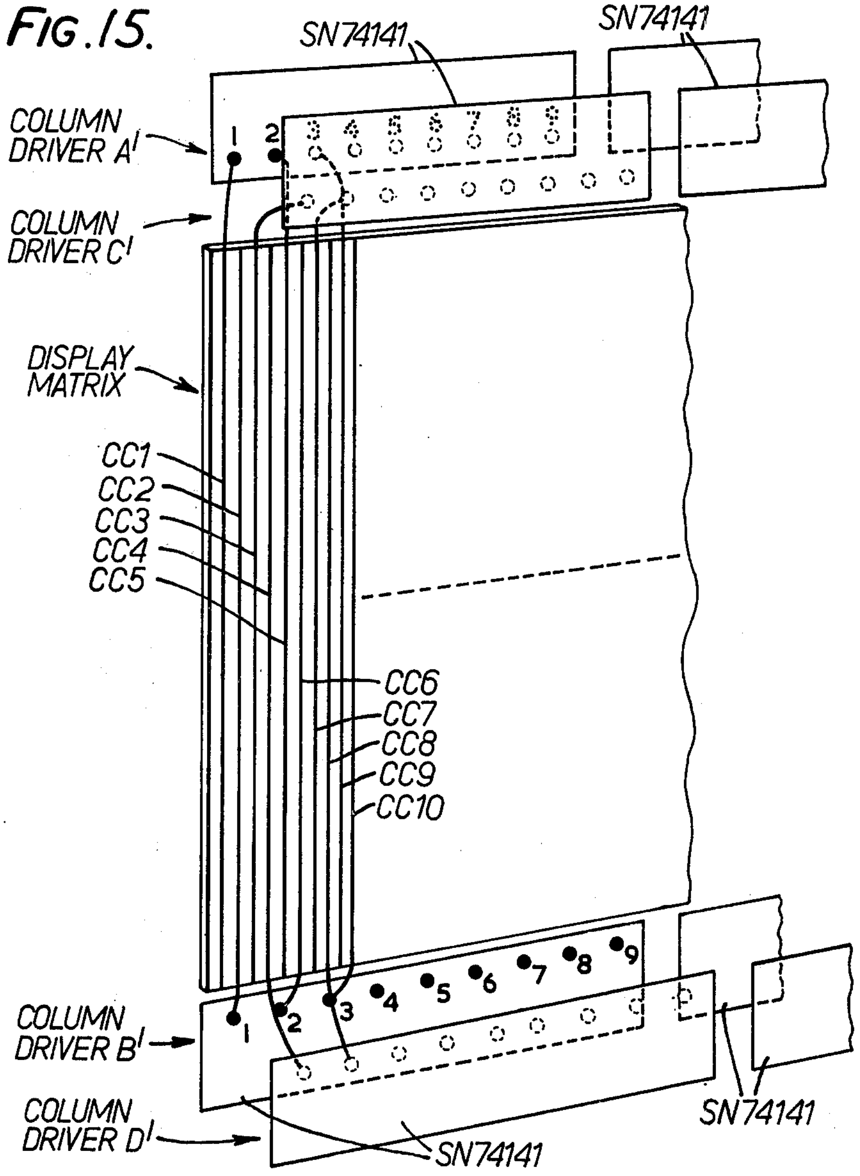

ELECTRONIC DISPLAY APPARATUS INCLUDING A DC-RESPONSIVE ELECTRO-LUMINESCENT PHOSPHOR SCREEN

This invention relates to display drive circuits.

In recent years, there have been a number of "flat panel" display screens developed which have two orthogonally arranged sets of conductors with some kind of light-emitting material or devices interposed between the sets of conductors. Lately, there has been developed a new type of phosphor (manganese and copper doped zinc sulphide) which is DC responsive and enables a particularly advantageous "flat panel" display screen to be made using a matrix of phosphor dots. Where the DC potential is in the form of a pulse of short duration, this new phosphor will emit useful light with an applied potential difference in excess of 90 V DC.

Such display screens are particularly useful if used in conjunction with circuitry to provide a scanned light emission, so emulating the familiar use of the cathode ray tube. Circuitry for performing this function is well known and operates by applying an electrical signal to each conductor in turn of one set whilst an electrical signal is applied to a selected conductor of the other set. For example, +70 V applied to a selected conductor of one set, −70 V applied to a selected conductor of the other set, the remaining conductors being at OV gives the required 140 V differential at the intersection of the two selected conductors. Logic circuitry can be used to scan the display screen in this manner.

Less recently, the choice of logic circuitry to work with potentials of ± 70 VDC would have involved the use of thermionic valves, but nowadays the advantages of integrated circuits using metal-oxide semiconductor technology make them a better choice. There is, however, one particular disadvantage of MOS logic circuitry and that is that it works at logic levels of OV and + 5V. Interface circuitry is therefore required to convert the OV and +5V logic signals to suitable levels to operate the display screen. One solution is to provide supplies of + 70V and −70V and to employ a number of switching elements controlled by the logic circuitry to connect and disconnect the supplies to the display screen. Such a solution will work perfectly satisfactorily but is open to objection on two accounts: (i) that it requires a large number of components and complex voltage interfaces and (ii) that failure of a switching element may result in the continuous application to the screen of a high potential for sufficiently long to damage it.

The present invention provides apparatus for addressing a display screen having transverse sets of conductors with electric signal activated material proximate the sets of conductors, the apparatus comprising:

first means to select one or more conductors of a first set and apply to the selected conductor or conductors a first potential difference relative to ground potential whilst simultaneously holding the remaining conductors of the first set at a second potential between ground potential and the first potential, and second means to select one or more conductors of a second set and apply to the selected conductor or conductors, at least partially co-existant with the application of the first and second potentials to the first set of conductors, substantially ground potential whilst holding the remaining conductors of the second set at a third potential between ground potential and the first potential so that said electric signal activated material is activated only at crossings between said selected conductors of the first and second sets.

The third potential can be equal to the second potential, the difference between the second potential and ground can be substantially one half of the difference between the first potential and ground, and the first potential can be in the range 90 to 140 volts.

Said first means can include a transistor switching circuit for each conductor of the first set. Each transistor swtiching circuit can comprise a complementary pair transistor switch. Each complementary pair transistor switch can comprise a transistor of one conductivity type having its collector connected to a source of the first potential and its emitter connected to the emitter of a transistor of the opposite conductivity type having its collector connected to a source of the second potential, the bases of the complementary pair transistor being connected in common and constituting the input of the circuit, the commoned emitters constituting the output of the circuit. A respective input transistor can be provided for each complementary pair transistor switch, each input transistor having its emitter arranged to receive an input, its base connected to a voltage source, and its collector connected to the input of its associated complementary pair transistor switch. A plurality of voltage sources can be provided for the bases of the input transistors, each voltage source being connected to the bases of a respective associated group of input transistors. Each voltage source can be a respective zener diode circuit. Said second means can include one or more semiconductor integrated circuit display drivers.

Said first means can include one or more semiconductor integrated circuit character generators.

Said second means can include logic circuitry responsive to a train of clock pulses to cause the said conductors of the second set to be scanned by application of ground potential sequentially to each conductor in turn of the second set. The logic circuitry can comprise a counter circuit having its output connected to a demultiplexor circuit, the output of which is connected to the first means.

Third means to generate the first and second potentials can comprise a step-up transformer arranged to receive the clock pulses at its primary and a rectifier circuit connected to the secondary of the transformer.

A brightness control can be provided, comprising a parallel-output counter arranged to respond to the clock pulses, means to combine the outputs of the parallel-output counter logically in a plurality of different ways, each way providing an output waveform having a respective mark/space ratio, and means to select one of the logical combinations and to limit light-emission from the display screen to the mark or space period of the output waveform corresponding to the selected logical combination.

Where the display screen is a rectangular matrix, the said first set of conductors can be the rows of the matrix and the said second set of conductors can be the columns of the matrix.

There can be provided *n* column driver circuits, *n* being an integer greater than one, each column driver circuit comprising a respective one, or a respective plurality, of said semiconductor integrated circuit display drivers, every *j*th column conductor being connected to the *j*th column driver circuit, *j* taking the value of each in turn of the integers in the range 1 to *n* inclusive, and means can be provided to address the column driver circuits sequentially.

Electrical connection to the column conductors can be made alternately from opposite edges of the rectangular matrix.

The means to address the column driver circuits sequentially can comprise a divide-by- $n$ circuit provided in the said counter circuit operative to cause the demultiplexor circuit to address the column driver circuits in sequence.

The integer $n$ can be two, the electrical connections to the column conductors from one edge of the screen being connected to one column driver circuit, the electrical connections to the column conductors from the opposite edge of the screen being connected to the other column driver circuit, and the divide-by-$n$ circuit being a divide-by-two circuit operative to cause the demultiplexor circuit to address the column driver circuits alternately.

The integer $n$ can be four, the electrical connections to the column conductors from one edge of the screen being connected alternately to the first and third column driver circuits, and the electrical connections to the column conductors from the opposite edge of the screen being connected alternately to the second and fourth column driver circuits.

The present invention also provides a method of addressing a display screen having two transverse sets of conductors with electric signal activated material proximate the sets of conductors, the method comprising:

applying to one or more selected conductors of a first set a first potential difference relative to ground whilst simultaneously holding the remaining conductors of the first set at a second potential between ground potential and the first potential, and applying to one or more selected conductors of a second set, at least partially co-existant with the application of the first and second potentials to the first set of conductors, substantially ground potential whilst holding the remaining conductors of the set at a third potential between ground potential and the first potential so that said electric signal activated material is activated only at crossings between said selected conductors of the first and second sets.

This display screen can be scanned by applying the first potential to each conductor in turn of the one set whilst applying substantially zero potential to a first conductor of the second set and then repeating the application of the first potential to each conductor in turn of the one set whilst applying substantially zero potential to a second conductor of the second set, and so on for the remaining conductors of the second set.

The invention also provides a method of obtaining an operating potential for a display screen having two orthogonally arranged sets of conductors with DC responsive light-emitting material interposed between the sets of conductors, the method comprising:

using clock pulses to drive a scanning circuit connected to scan the screen, feeding the clock pulses into the primary of a step-up pulse transformer, rectifying the output of the pulse transformer, and using the rectified output as an operating potential for the screen.

The invention also provides an apparatus for operating a display screen having two orthogonally arranged sets of conductors with DC responsive light-emitting material interposed between the sets of conductors, the apparatus comprising:

a source of timing pulses, a step-up pulse transformer connected to receive the timing pulses at its primary, rectifying means connected to the secondary of the transformer, a plurality of output terminals for connection to the conductors of the display, switching means connected to control the application of the output of the rectifying means to the output terminals, and logic means responsive to the source of timing pulses to control the switching means to scan the display screen.

The transformer can have a centre-tapped secondary to produce a first potential substantially twice a second potential.

Figure 3A:
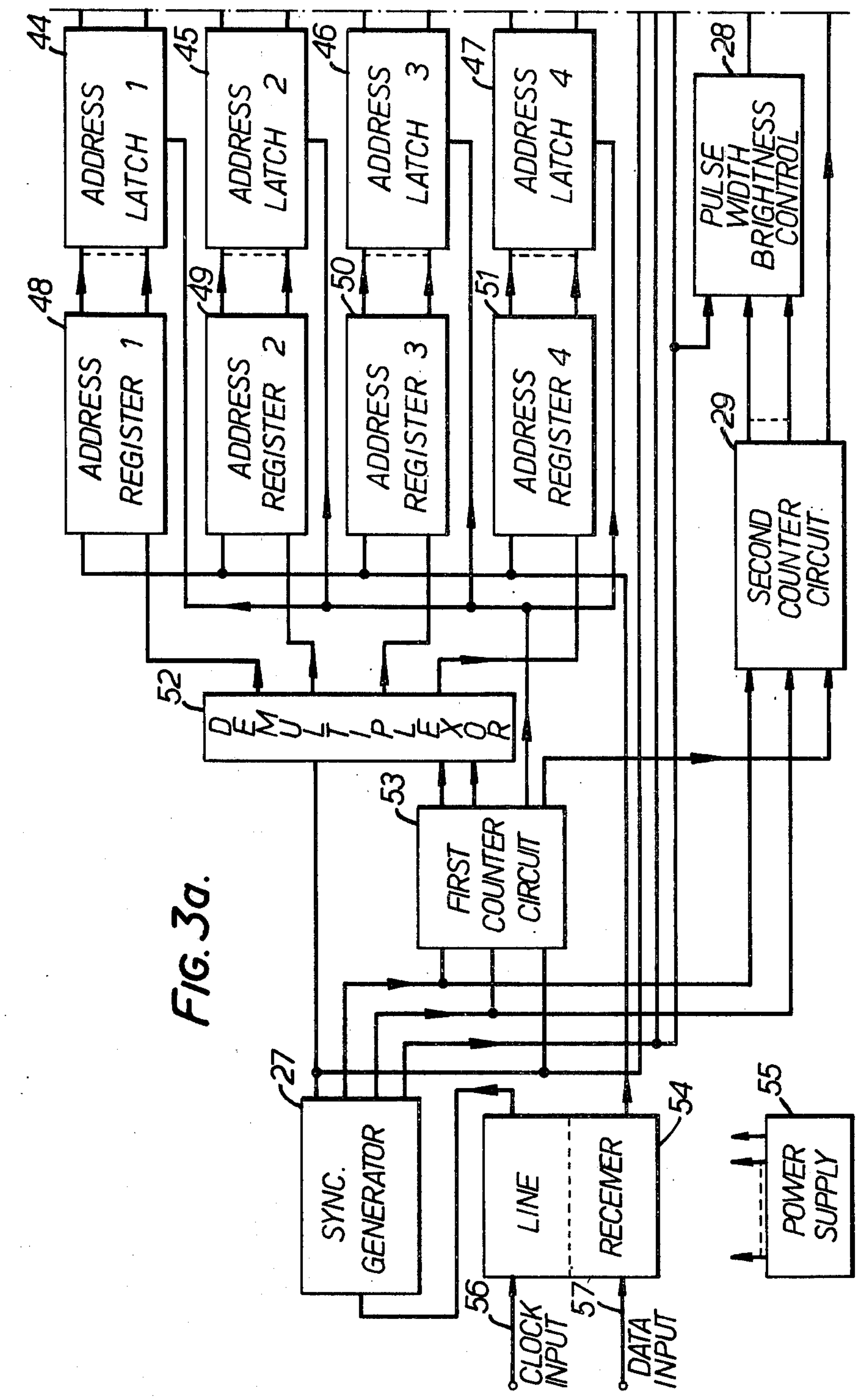
Figure 3B:
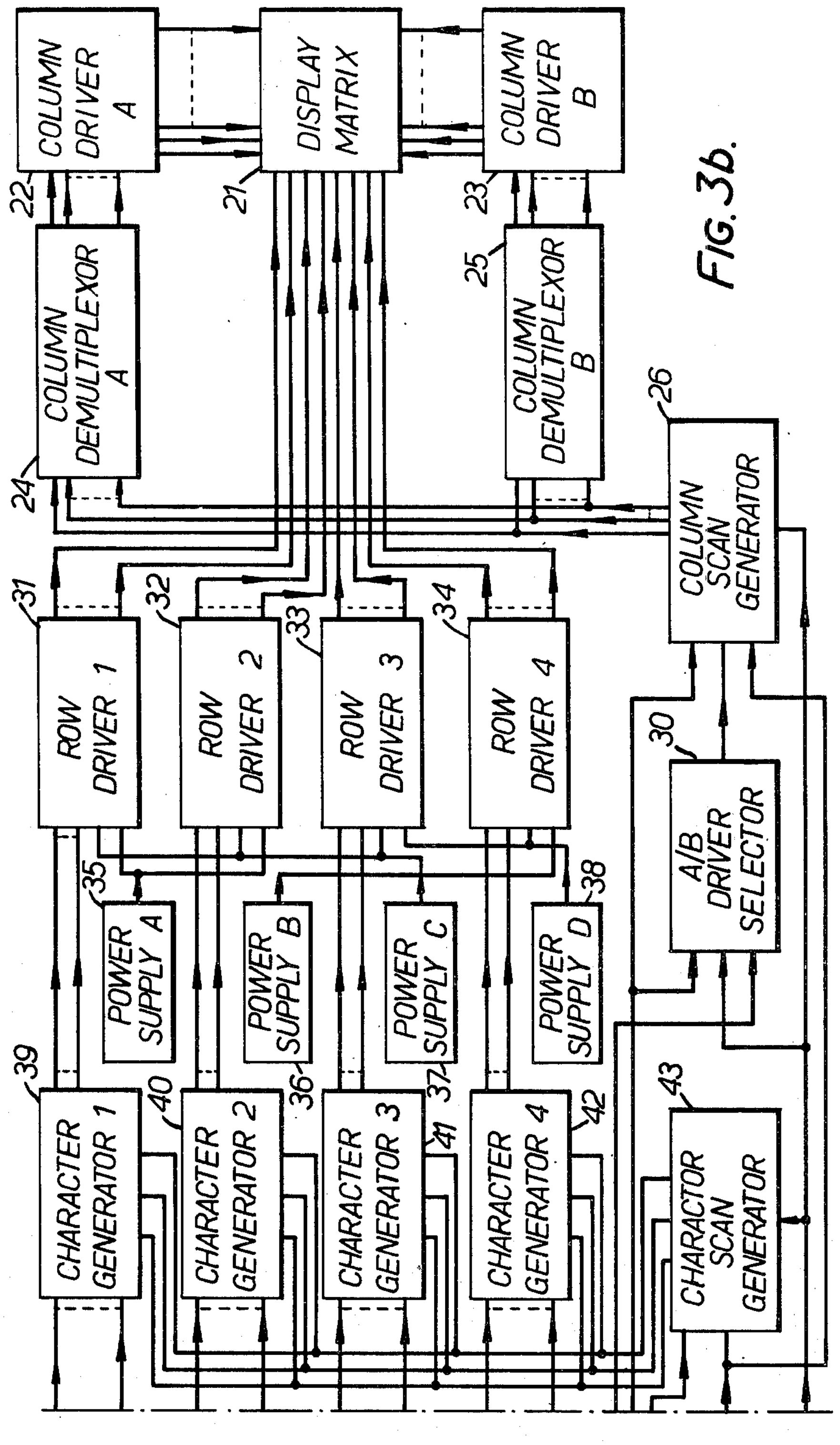
Figure 4:
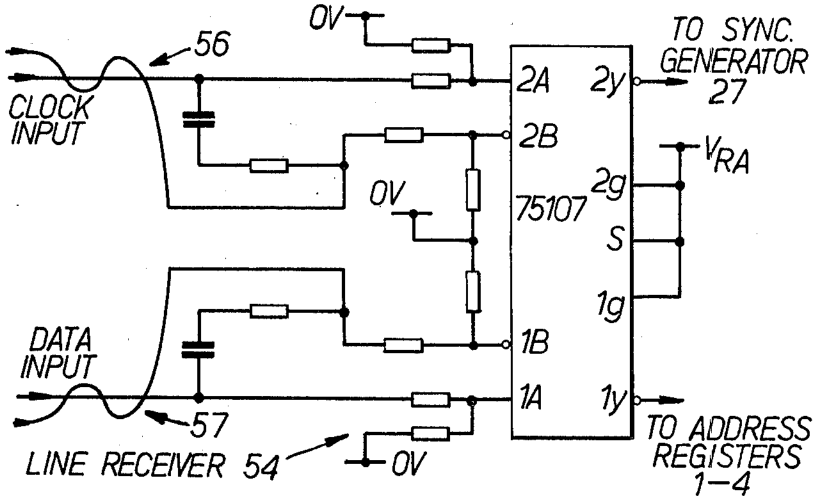
Figure 5:
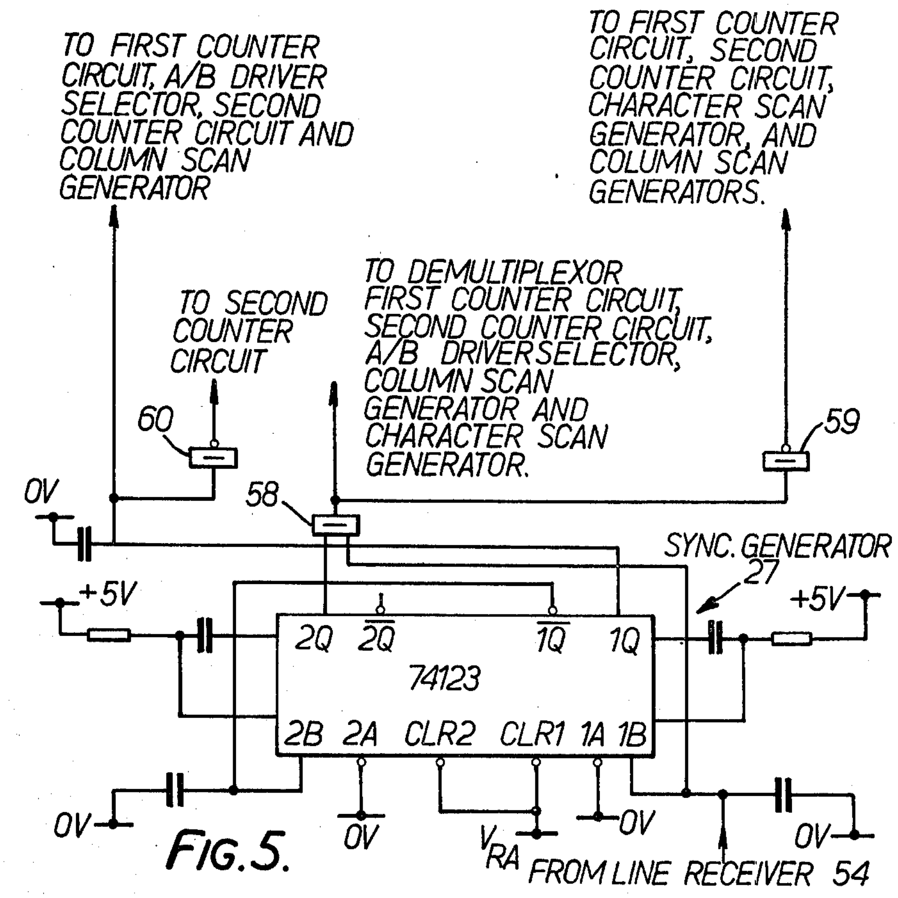
Figure 5A:
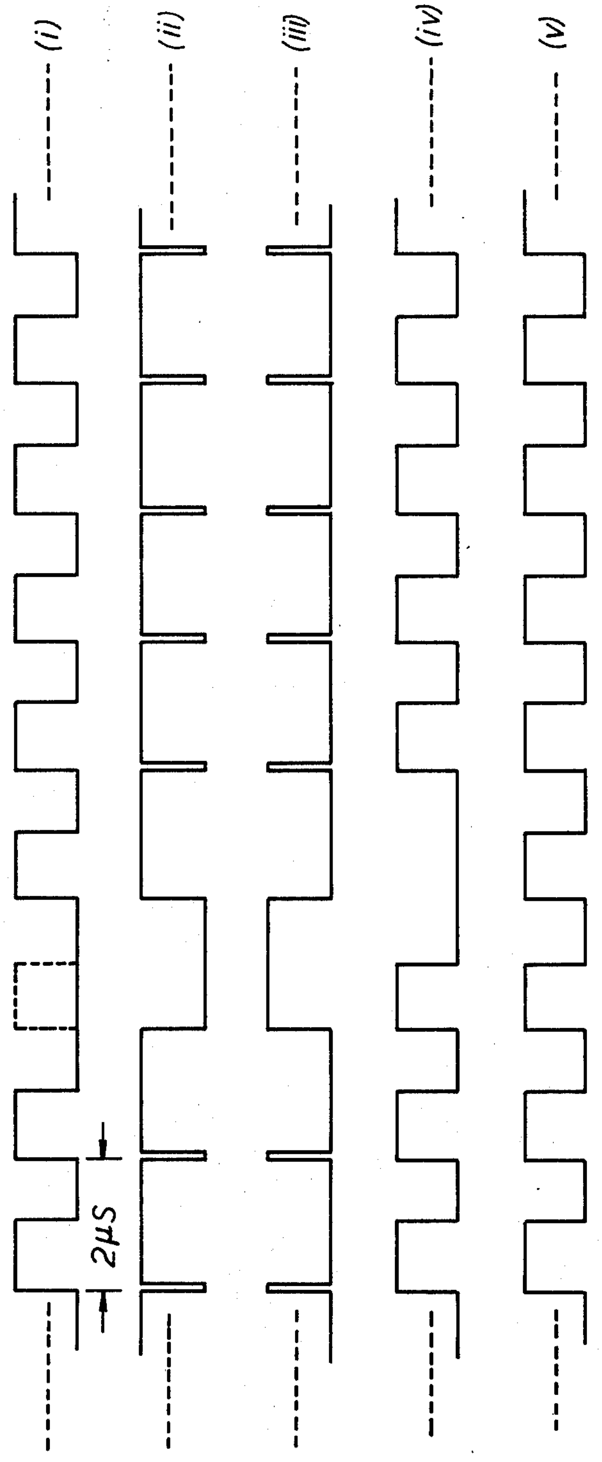
Figure 6:
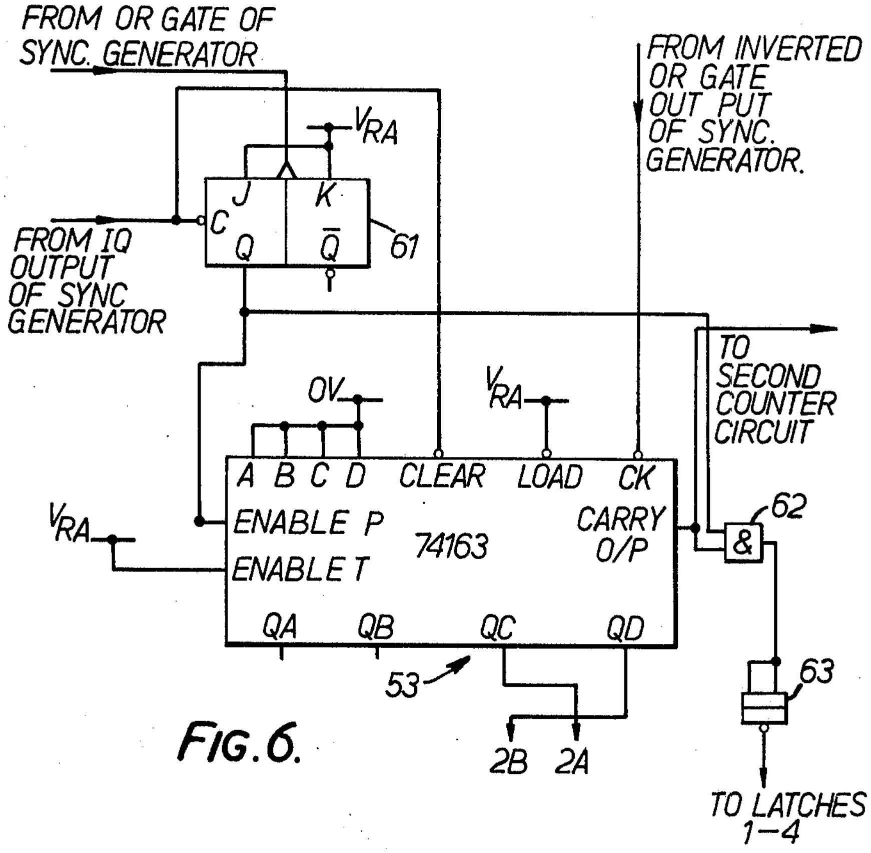
Figure 7:
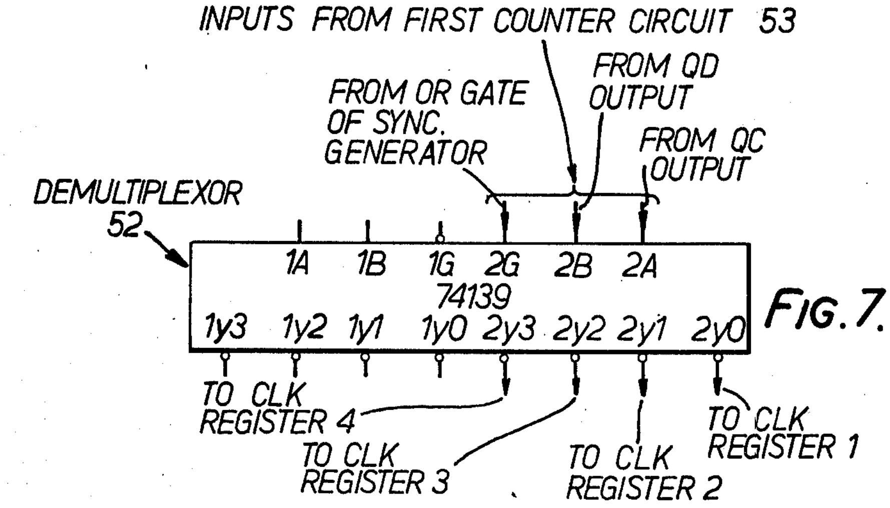
Figure 6A:
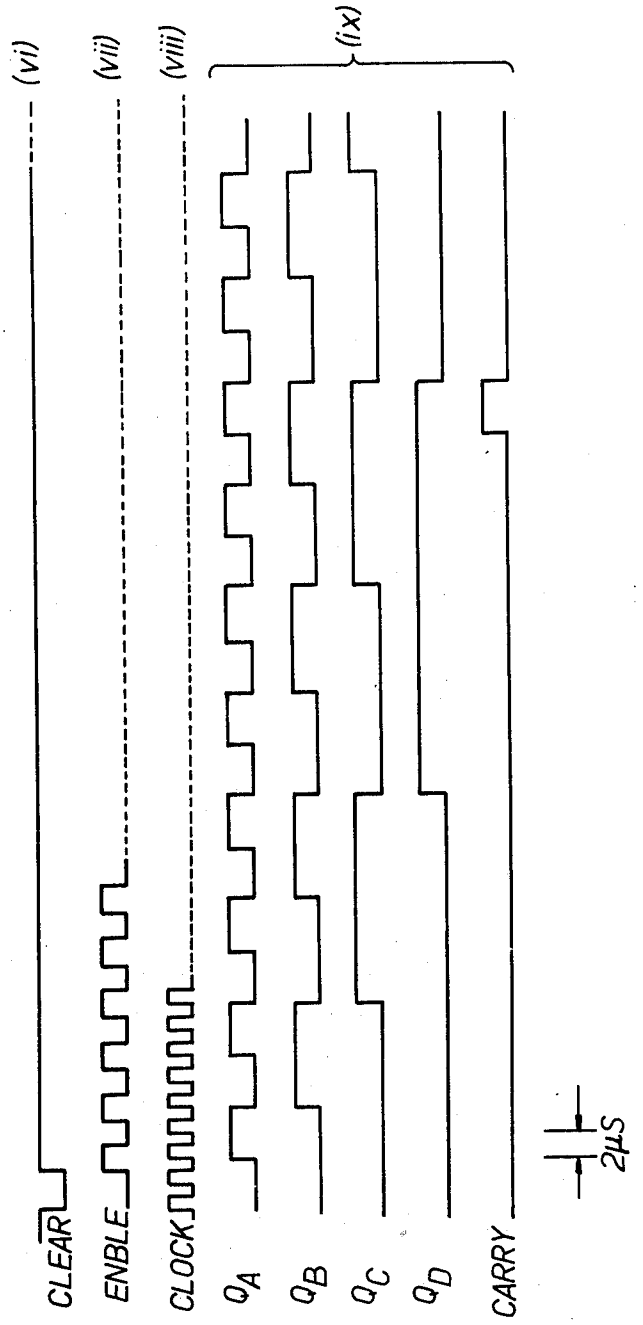
Figure 7A:
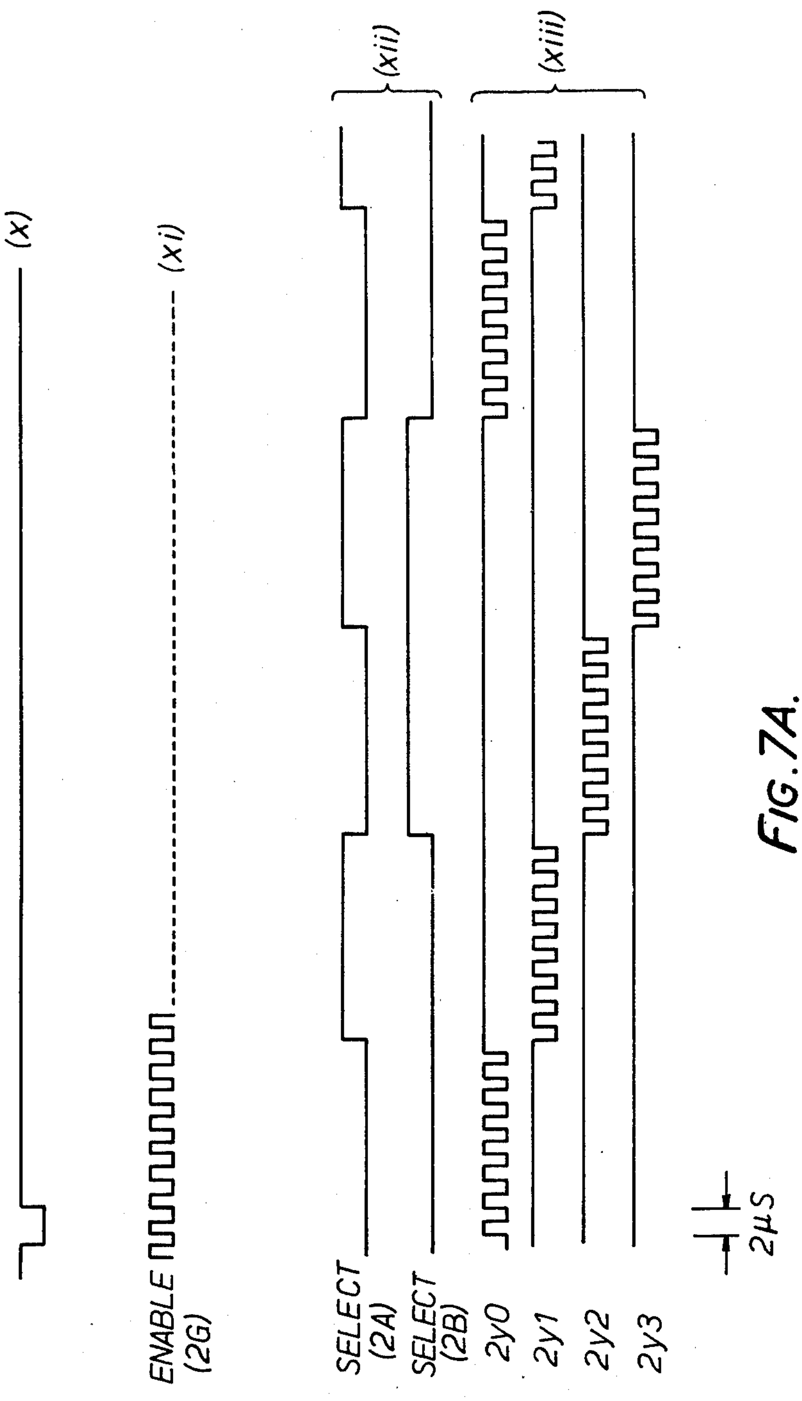
Figure 8A:
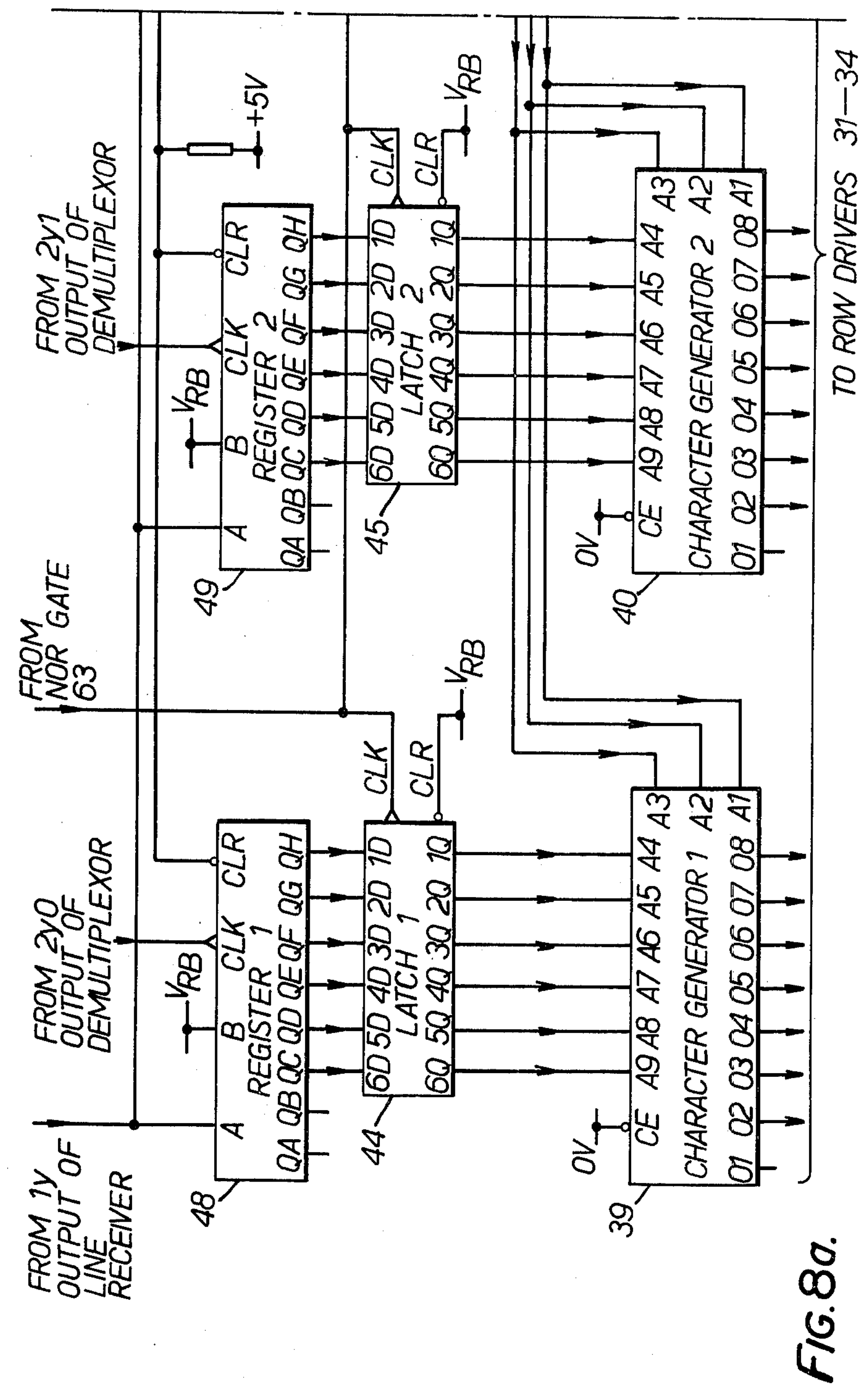
Figure 9:
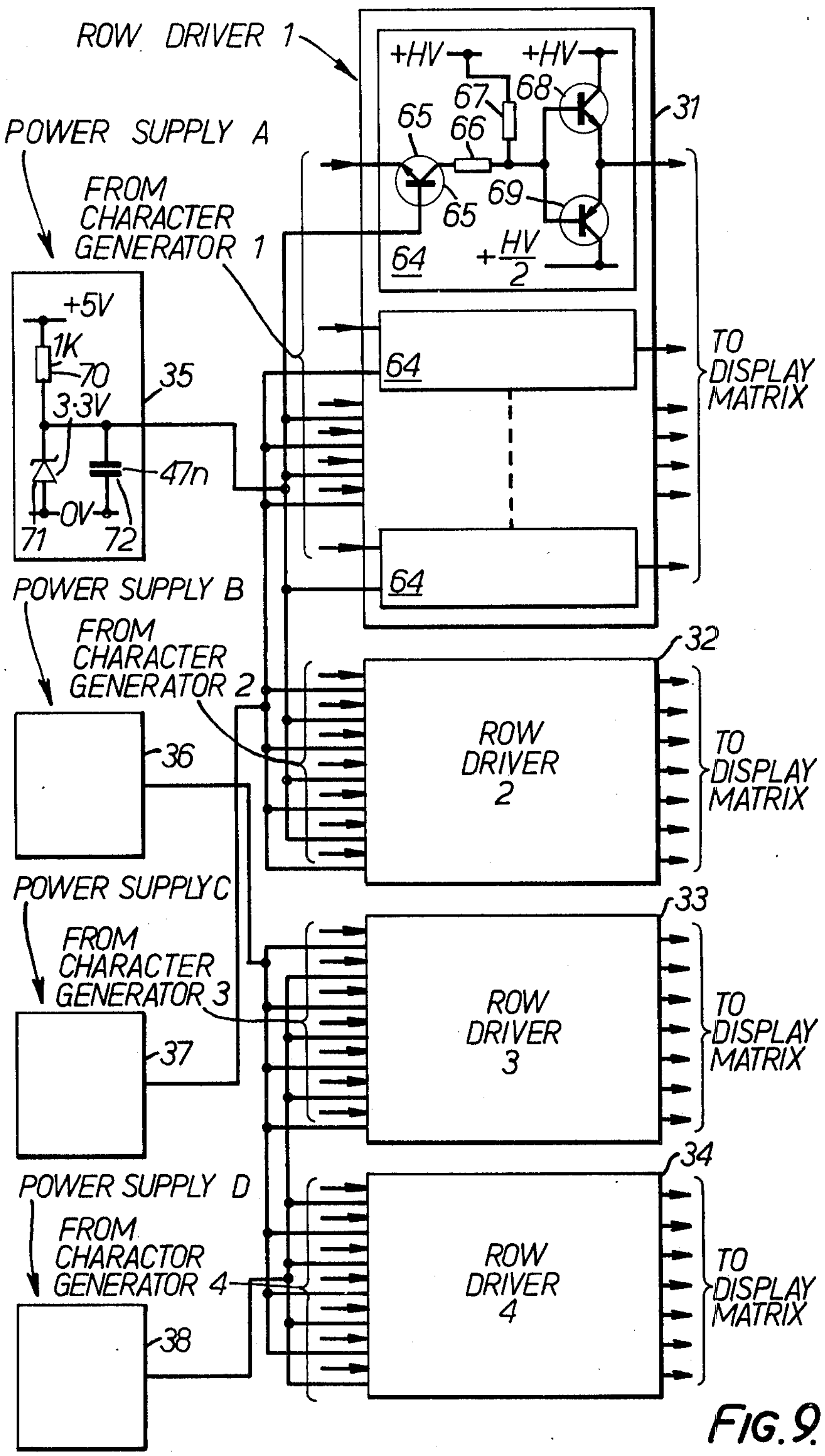
Figure 10:
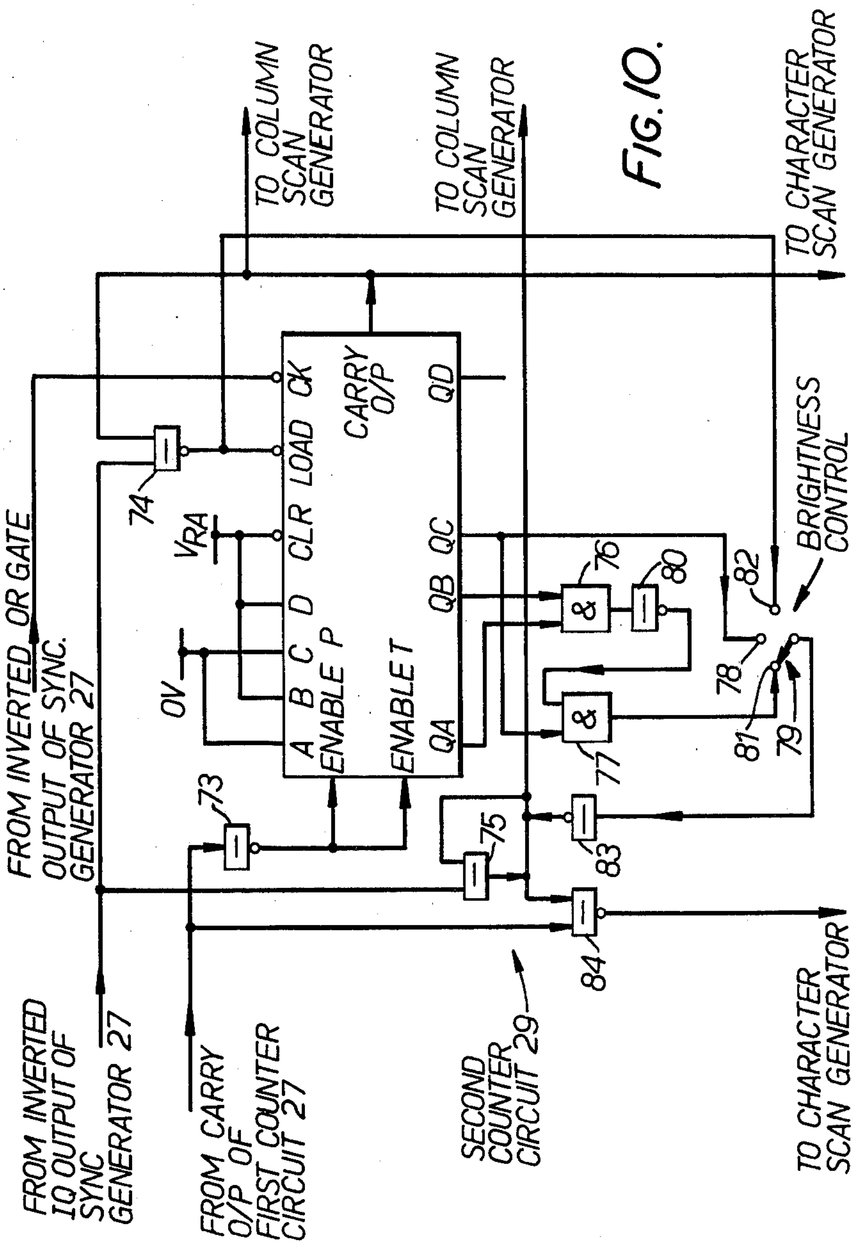
Figure 10A:
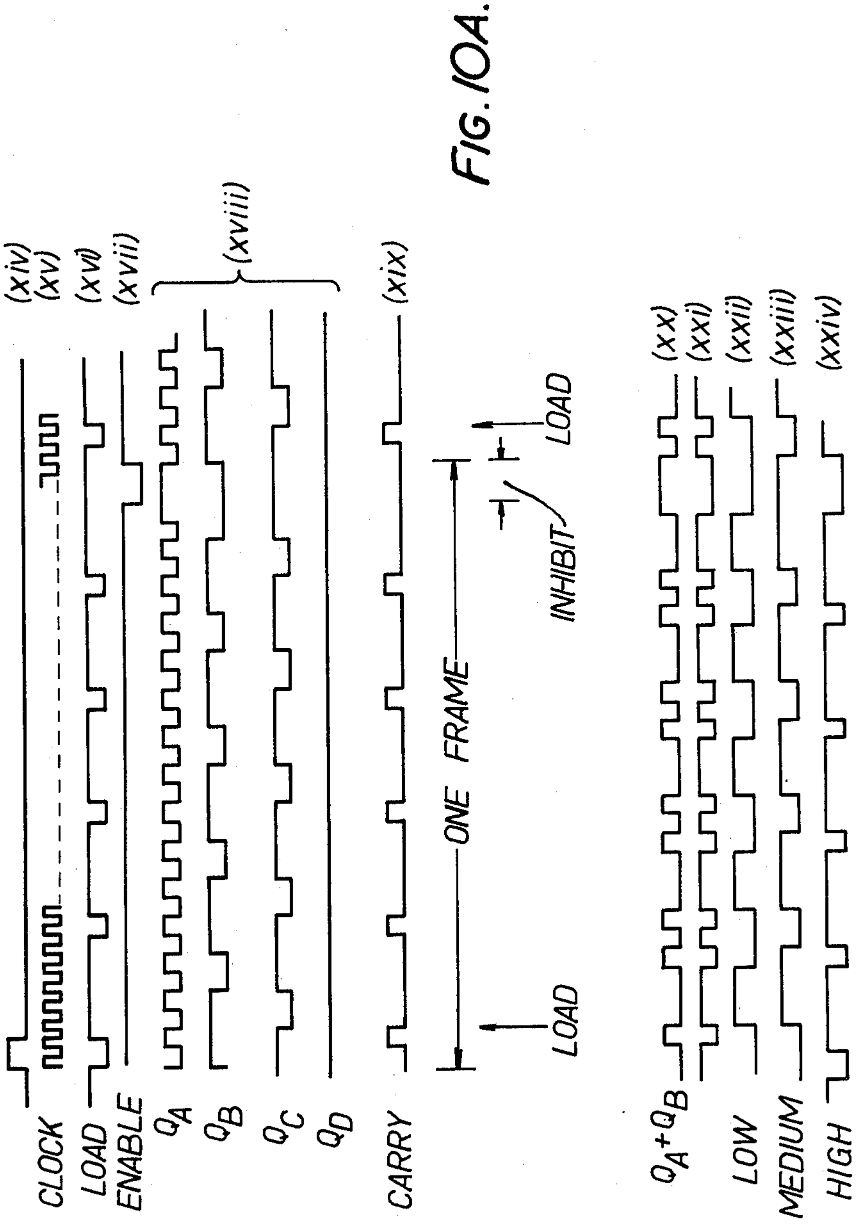
Figure 11:
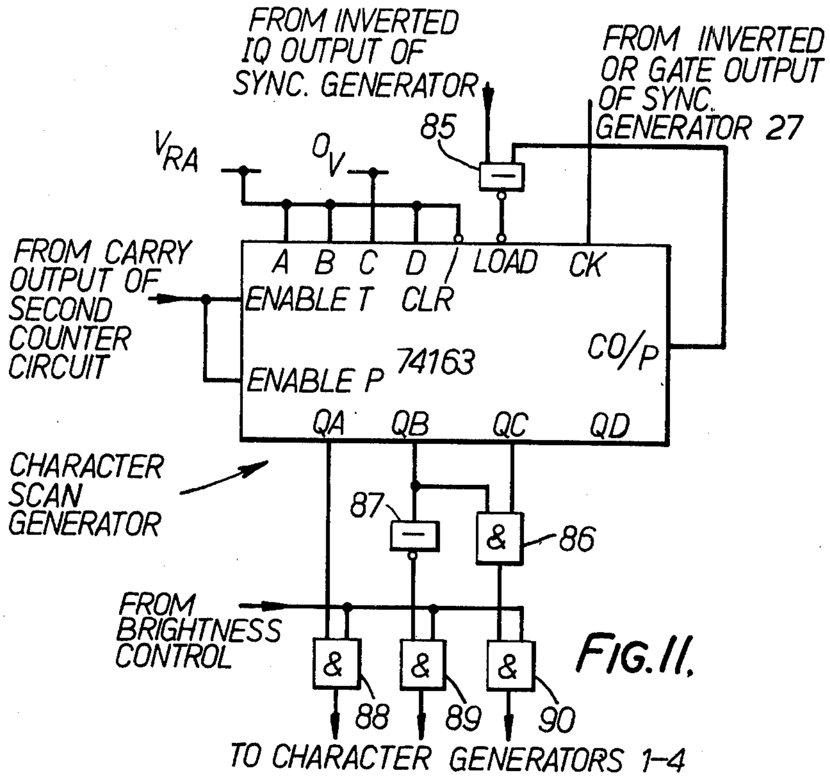
Figure 11A:
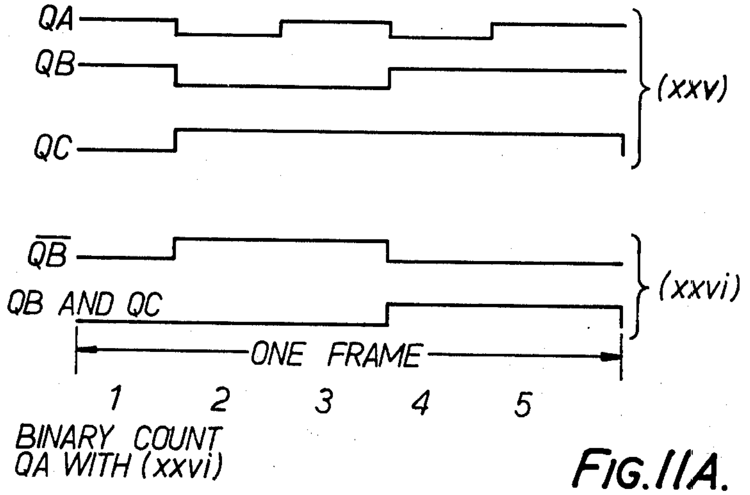
Figure 12:
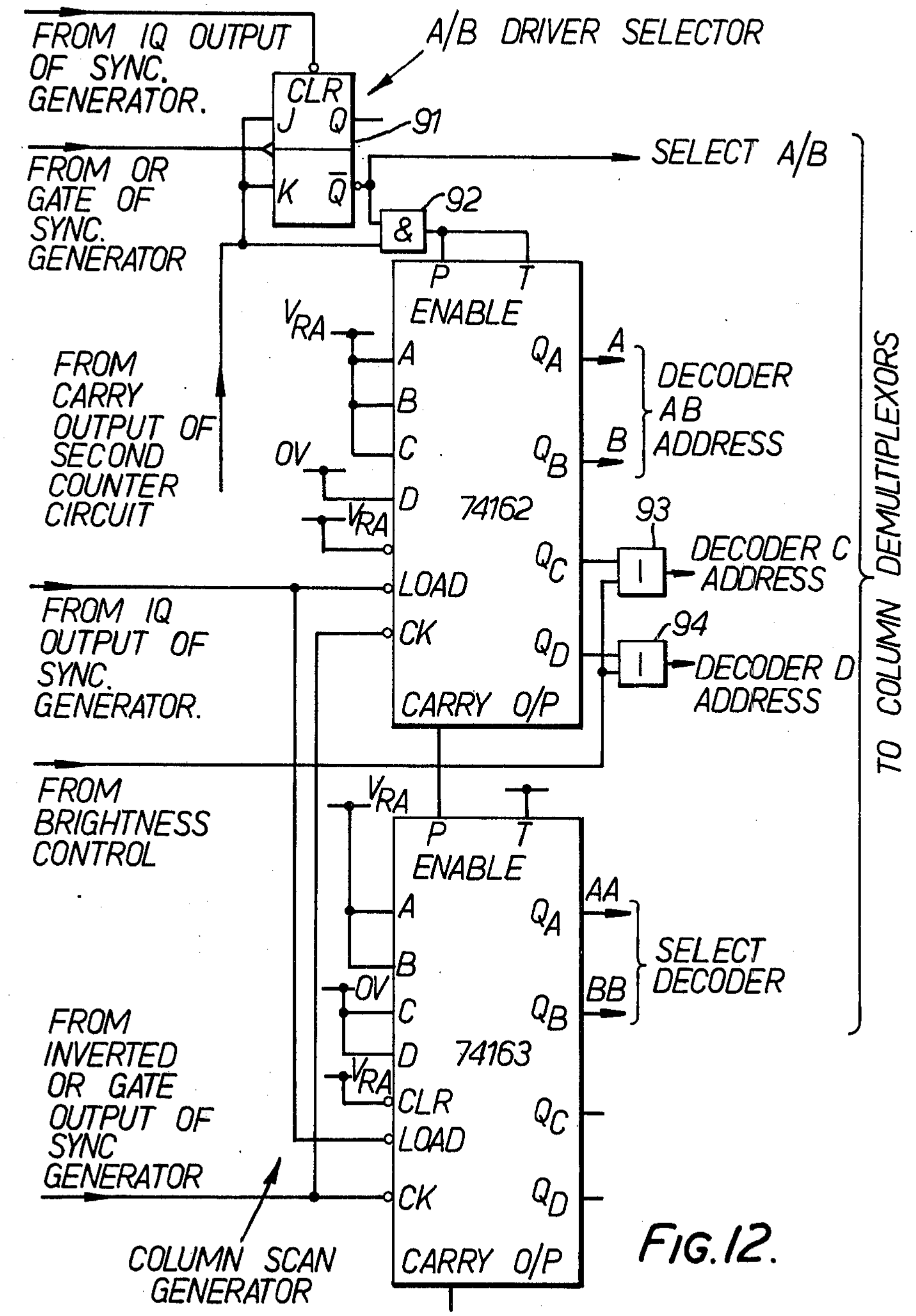
Figure 13:
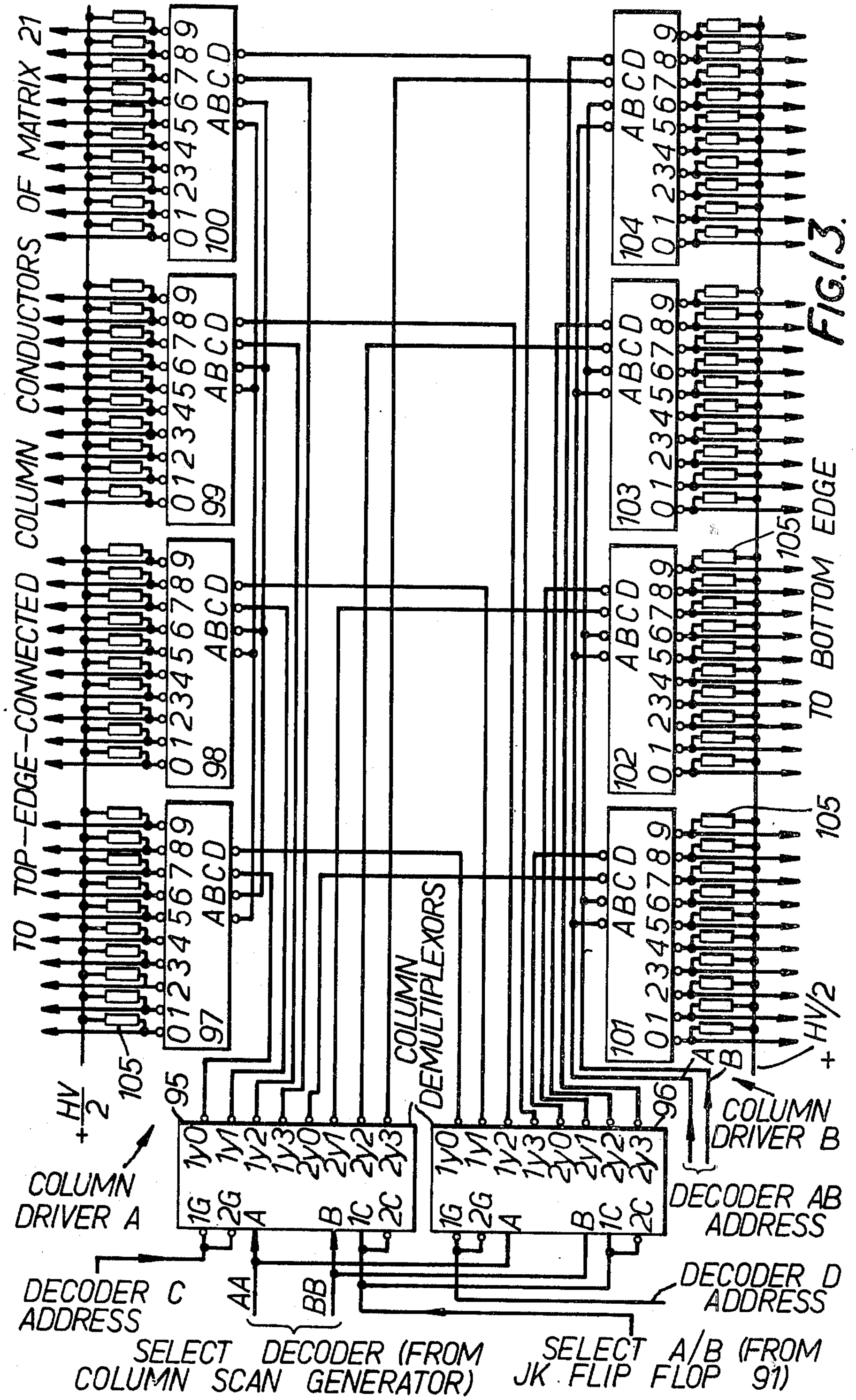
Figure 14:
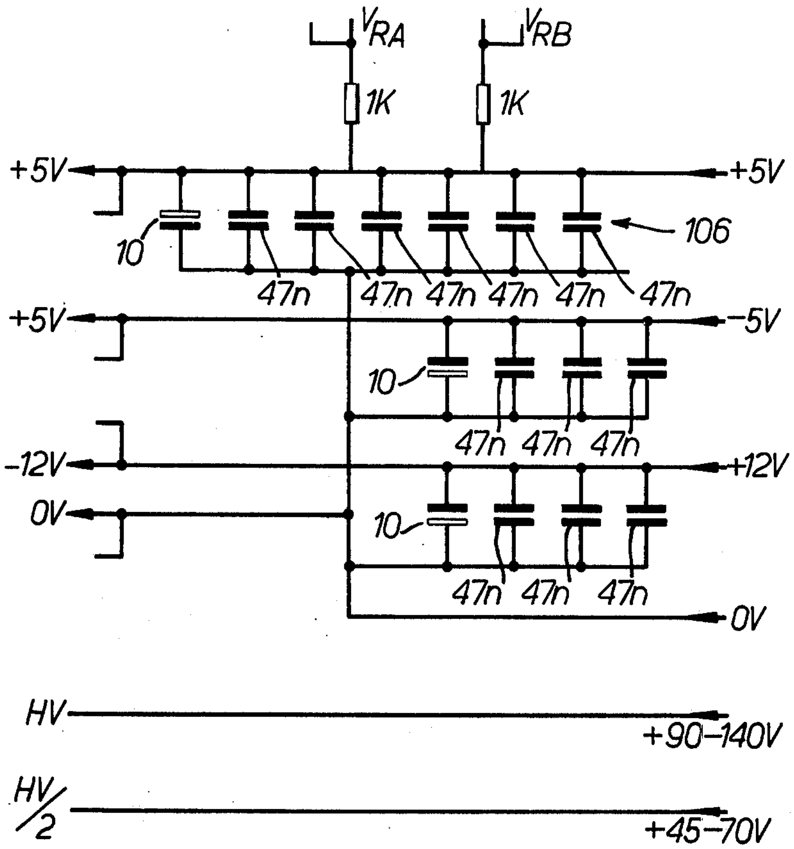

By way of example only, certain illustrative embodiments of the invention will now be described with reference to the accompanying drawings, in which:

FIG. 1 shows a block schematic diagram of automatic call recording equipment embodying the invention, FIGS. *2a* & *2b* show detailed circuitry corresponding to the block diagram of FIG. 1, FIGS. 3*a* & 3*b* are a block schematic diagram of a second embodiment of the invention, FIG. 4 shows the circuit of a line receiver used in the block diagram of FIG. 3, FIG. 5 show the circuit of a synchronisation generator used in the block diagram of FIG. 3, FIG. 5A shows waveforms pertaining to the circuit of FIG. 5, FIG. 6 shows the circuit of a first counter circuit used in the block diagram of FIG. 3, FIG. 6A shows waveforms pertaining to the circuit of FIG. 6, FIG. 7 shows the circuit of a demultiplexor used in the block diagram of FIG. 3, FIG. 7A shows waveforms pertaining to the circuit of FIG. 7, FIGS. 8*a* & *b* shows the circuits of address registers, latches and character generators used in the block diagram of FIG. 3, FIG. 9 shows the circuits of row drivers and power supplies for the row drivers used in the block diagram of FIG. 3, FIG. 10 shows the circuit of a brightness control used in the block diagram of FIG. 3, FIG. 10A shows waveforms pertaining to the circuit of FIG. 10, FIG. 11 shows the circuit of a character scan generator used in the block diagram of FIG. 3, FIG. 11A shows waveforms pertaining to FIG. 11, FIG. 12 shows the circuit of a column scan generator used in the block diagram of FIG. 3, FIG. 13 shows the circuit of column demultiplexors and column drivers used in the block diagram of FIG. 3, FIG. 14 shows the circuit of another power supply used in the block diagram of FIG. 3, and FIG. 15 shows diagrammatically an alternative arrangement of column drivers and column scan generator.

Figure 2A:
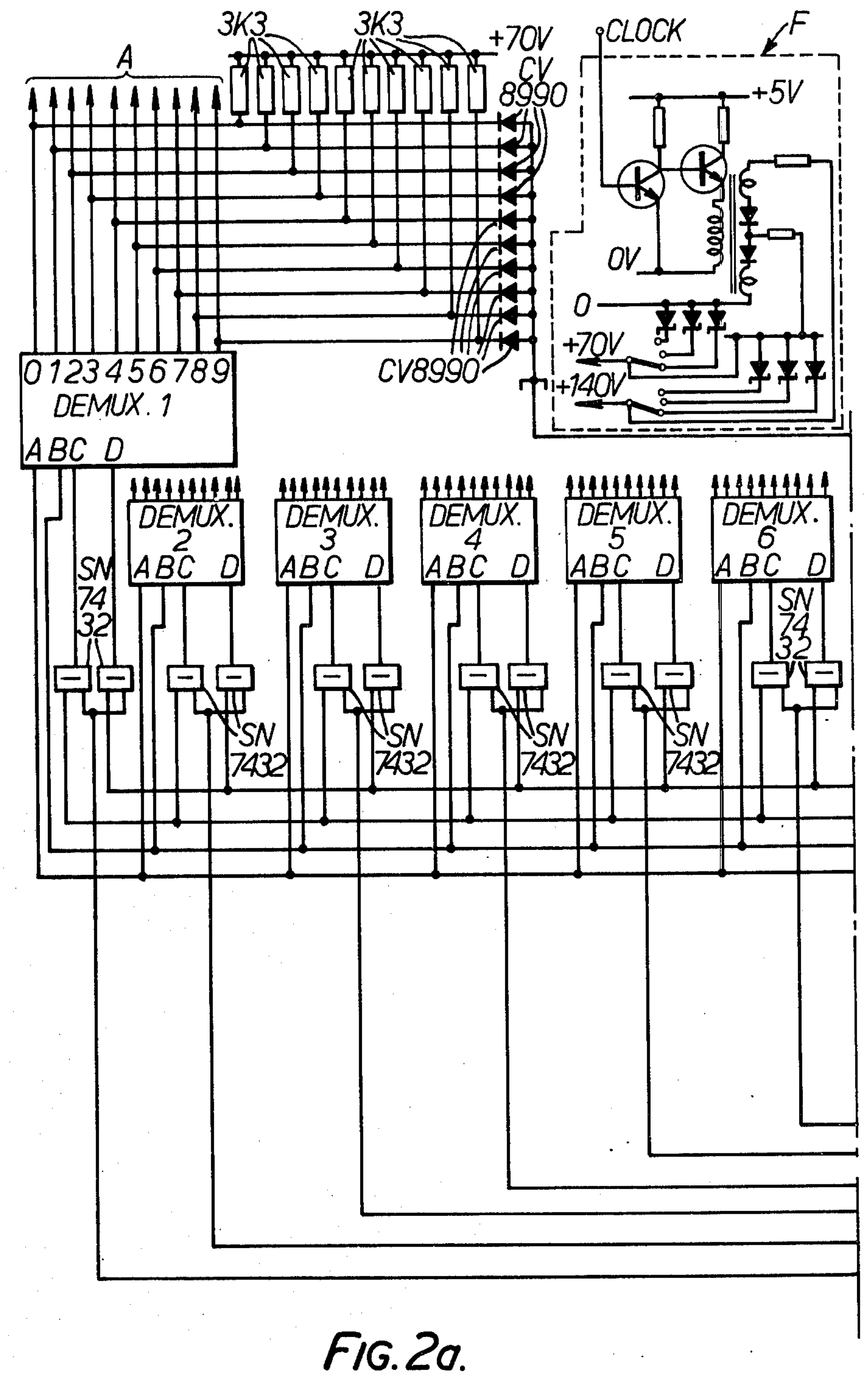
Figure 2B:
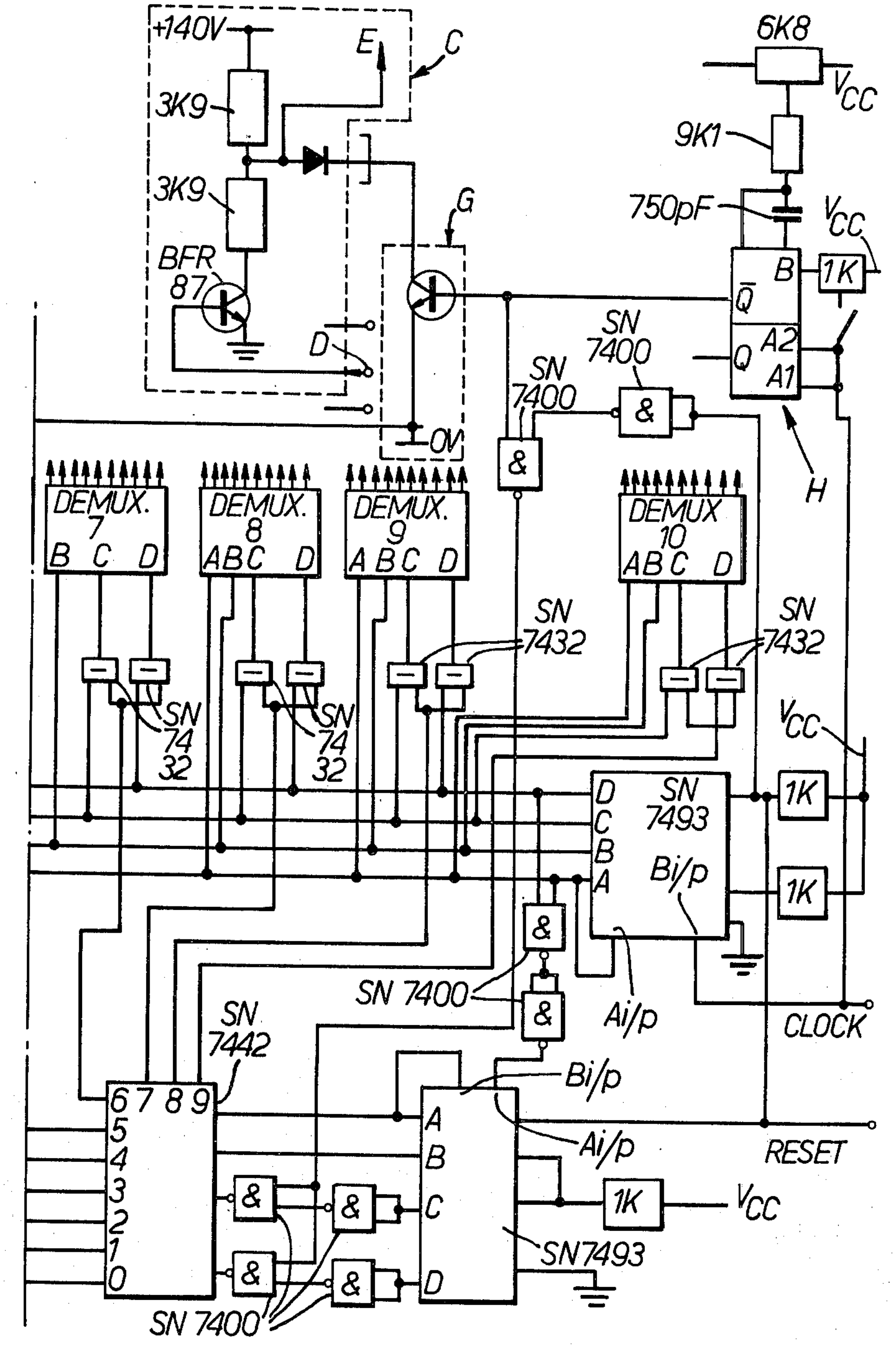

The automatic call recording equipment shown in FIGS. 1 and 2 was designed to provide an indicator panel for a telephone switch board.

Referring to FIG. 1, reference 1 is a display screen with one hundred active column conductors and twenty-eight row conductors and a DC responsive phosphor interposed. An "active" column conductor is one to which a drive signal is applied as opposed to an unconnected conductor used merely for spacing.

Reference 2 shows connections to the column conductors (only two shown), reference 3 shows connections to the row conductors (only two shown).

Reference 4 is switching circuitry for applying operating potential to the column conductors. Reference 5 is switching circuitry for applying operating potential to the row conductors.

Reference 6 is scanning logic which controls the switching circuitry 4 and 5.

Reference 7 is control logic and a display refresh store, including a read only memory, which modulates the display by a control line 8 and clocks and re-sets the scanning logic by a control line 9.

Reference 10 shows a keyboard and an interface connected to a data processor which control the logic and store 7 and enter data into equipment. The data processor (not shown apart from its interface) is connected to the telephone equipment to obtain the data to be displayed.

Detailed circuitry is to be found in FIG. 2.

Reference A shows connections to ten of the one hundred active column conductors. These ten connections are taken from a demultiplexor DEMUXI which is a commerically available integrated unit for driving a Nixie (RTM) valve. The other ninety column conductors are connected in like manner to another nine similar demultiplexors DEMUX 2 to DEMUX 10.

Reference B is logic circuitry which controls the demultiplexors and causes them to scan the column conductors. The scan is accomplished by applying + 70V to ninety-nine of the column conductors and OV to the remaining, selected, conductor.

Reference C is a row driver element. There are twenty-eight row driver elements but only one is illustrated. These row driver elements each receive a control signal from read only memories (ROM's) on their control line D. Reference E is the connection to the row conductor. The read only memories cause the row driver elements to scan the row conductors. The scan is accomplished by applying + 70V to thirty-five of the row conductors and + 140V to the remaining, selected, conductor.

Reference F is the power unit which supplies + 70V and + 140V. These supplies are not continuous but are pulsed in synchronism with the scanning of the display. Reference G is a discharge or blanking element operating in conjunction with isolating diodes. Scanning and blanking proceeds as follows: row one, - blank - row one, column two - blank - row one, column three - blank etc. Since the +70V and +140V are not required during blanking, a pulsed supply is possible. It should be noted that the display screen is highly capacitive.

The power unit F comprises a two stage buffer amplifier receiving clock pulses. The output of the amplifier is fed into a step-up pulse transformer having a centre-tapped secondary winding. One end of the winding is taken as the OV level and the lower half is rectified to provide output pulses a little in excess of 70V. These output pulses are connected to a selected one of three zener diodes and this selected diode clips the pulses to its zener voltage. The three diodes have different zener voltages to allow a particular one of three voltage levels to be selected. The other end of the winding produces pulses a little in excess of 140V and is likewise clipped by a selected one of three zener diodes.

The +70V output is applied to each column conductor through a respective resistor. The conductor end of each resistor is grounded (OV) or not (+ 70 V) under control of the associated demultiplexor.

The + 140 V output is applied to each row driver element C. Each connection E is taken from the centre-point of two equal series connected resistors. If the lower end of the resistors is grounded by an associated transistor the potential at E is + 70V, if not, the potential is +140V. The scanning and ON/OFF data modulation of the row driver elements is under control of the read only memory.

Reference H is a pulse width control for the blanking and hence a brightness control.

The preferred scan rate is one thousand times per second.

The advantage of the use of the circuit F is that separate +70V and +140V power supplies are not required and that the circuitry which is provided uses few components.

The advantage of operating as follows: for example, column conductor potentials: + 70, 0, + 70, + 70 etc. and for example, row conductor potentials: + 70, + 70, + 70 + 140, + 70 etc rather than as follows: for example, column conductor potentials: 0, 0, −70, 0, 0 etc. for example, row conductor potentials: 0, 0, 0, +70, 0 etc. is that the need to generate both positive and negative voltages is avoided and an MOS to display screen interface of relatively simple circuitry is possible. The former method of operating is also believed to be less likely to result in damage to the display screen in the event of a circuit failure.

It is, of course, possible to have continuous +70 V and + 140V power supplies and to switch these instead of using the circuit F, although the circuit as described is preferred.

A second embodiment of the invention will now be described with reference to FIGS. 3 to 14, of which FIG. 3 is a block diagram of display apparatus embodying the invention. Referring to FIG. 3, reference 21 is a display matrix or screen with eighty column conductors and twenty-eight row conductors and a DC responsive phosphor interposed. The phosphor being in the form of phosphor dots each with a diameter of approximately 0.025 inches. Connection is made to odd column conductors at one edge of the matrix 21 and connection is made to even column conductors at the opposite edge of the matrix. This arrangement simplifies the physical problem of making connections to the matrix.

The top-edge connected conductors of the matrix are connected to a first column driver circuit, "COLUMN DRIVER A" reference 22 and the bottom-edge connected column conductors are connected to a second column driver circuit, "COLUMN DRIVER B" reference 23.

Column drivers A and B are connected to the outputs of respective demultiplexors, "COLUMN DEMULTIPLEXOR A" reference 24 and "COLUMN DEMULTIPLEXOR B" reference 25. The demultiplexors 24 and 25 receive their inputs from a column scan generator 26. The column scan generator 26 receives inputs from a synchronisation generator 27, a pulse width brightness control 28, a counter circuit 29 ("SECOND COUNTER CIRCUIT") and a circuit to select between the driving of odd and even column conductors the "A/B DRIVER SELECTOR" reference 30.

The row conductors of the matrix 21 are divided into four groups of seven conductors, each group being connected to a respective one of four row driver circuits ("ROW DRIVER 1", "ROW DRIVER 2", "ROW DRIVER 3" and "ROW DRIVER 4") references 31, 32, 33 and 34 respectively. A first power supply "POWER SUPPLY A" reference 35 supplies power to ROW DRIVERS 1 and 2, a second power supply "POWER SUPPLY B" reference 36 to ROW DRIVERS 3 and 4, a third power supply "POWER SUPPLY C" reference 37 to ROW DRIVERS 1 and 2, and a fourth power supply "POWER SUPPLY D" reference 38 to ROW DRIVERS 3 and 4. The exact arrangement of these power supplies will be made clear later by reference to the detailed circuit diagrams.

The ROW DRIVERS 1 to 4 receive their inputs from respective character generation circuits "CHARACTER GENERATOR 1" reference 39, "CHARACTER GENERATOR 2" reference 40, "CHARACTER GENERATOR 3" reference 41, and "CHARACTER GENERATOR 4" reference 42. The CHARACTER GENERATORS 1 to 4 receive their inputs from a CHARACTER SCAN GENERATOR 43 and a respective one of four address latch circuits "ADDRESS LATCH 1" reference 44, "ADDRESS LATCH 2" reference 45, "ADDRESS LATCH 3" reference 46, and "ADDRESS LATCH 4" reference 47.

The ADDRESS LATCHES 1 to 4 receive their inputs from a counter circuit 53 and from respective ones of four address registers "ADDRESS REGISTER 1" reference 48, "ADDRESS REGISTER 2" reference 49, "ADDRESS REGISTER 3" reference 50, and "ADDRESS REGISTER 4" reference 51. The ADDRESS REGISTERS 1 to 4 receive their inputs from a demultiplexor 52 and a line receiver 54.

The demultiplexor 52 receives its inputs from the synchronisation generator 27 and the counter circuit 53 ("FIRST COUNTER CIRCUIT"). An output of the counter circuit 53 is used as an input to the counter circuit 29.

The synchronisation generator 27 receives its input from the line receiver 54.

A power supply 55 supplies power to the circuits just described but its connections are not shown in detail in FIG. 3.

The above description outlines the interconnection of the blocks of FIG. 3 and a description of their operation will next be given and followed by a detailed description of the circuits used.

The display apparatus shown in FIG. 3 has a clock input 56 and a data input 57. A 500 kilohertz clock signal is applied to the clock input 56, the clock signal comprising a repeated sequence of 512 pulses with each 513th pulse omitted for synchronisation purposes.

Information to be displayed is entered in digital form on the data input 57. The purpose of the line receiver 54 is to provide suitable input circuitry for receiving the incoming clock and data signals.

The information data takes the form of 512 -bit frames, each frame representing one complete scan of the display matrix 21. Each frame is made up of sixteen words, each word representing a column of four characters. Each word is made up of fours bytes, each byte representing a character. Each byte is made up of eight bits, six bits being used to specify a character and two being redundant in each byte. Each character is produced on the matrix 21 in the form of a $7 \times 5$ matrix of dots, that is employing seven rows and five columns. The display capability is, of course, sixteen characters across by four characters deep since $16 \times 5 = 80$ (the number of column conductors) and $4 \times 7 = 28$ (the number of row conductors.

The clock signal is applied by the line receiver 54 to the synchronisation generator 27 which detects the omitted 513 th pulses to synchronise the operation of the display apparatus. The synchronisation generator 27 supplies clock waveforms to those blocks in FIG. 3 which require them.

The line receiver applies the received data to the ADDRESS REGISTERS 1 to 4, and the demultiplexor 52 controlled by the sync generator 27 and counter circuit 53 controls the entry of data into the ADDRESS REGISTERS 1 to 4. Data is transferred from the ADDRESS REGISTERS 1 to 4 to respective ones of the ADDRESS LATCHES 1 to 4 under control of the counter circuit 53. Each ADDRESS LATCH stores the identity of a respective character to be generated on the display matrix 21.

As an example, let it be supposed that it is desired for the following display to appear on the matrix screen 21:

ABC . . . etc
DEF . . . etc
GHI . . . etc
JKL . . . etc

The data intput is thus an instruction in digital form equivalent to "DISPLAY ADGJ, BEHK, CFIL, . . . etc". The instructions "DISPLAY A", "DISPLAY D", "DISPLAY G", and "DISPLAY J" are entered respectively into ADDRESS REGISTERS 1, 2, 3 and 4. This information is then transferred to the respective ADDRESS LATCHES whilst "DISPLAY B", "DISPLAY", "DISPLAY H", and "DISPLAY K" is entered into respective ones of the ADDRESS REGISTERS 1, 2, 3 and 4.

CHARACTER GENERATORS 1, 2, 3 and 4 now generate the outputs necessary to produce the characters whose identities are stored in the respective ADDRESS LATCHES. Suppose that the column conductors of the matrix 21 are numbered left to right as CC1, and CC2, CC3 etc. . . . CC80, then the sequence of events is as follows:

(i) simultaneously apply the following potentials to the conductors of the screen:

HV (where HV lies in the range +90 to +140V) to those row conductors indicated by the CHARACTER GENERATORS as needing to be enabled, HV/2 to those row conductors not so indicated by the CHARACTER GENERATORS, zero potential to CC1, HV/2 to all remaining column conductors CC2 to CC80

(ii) step on the CHARACTER GENERATORS one place and simultaneously apply the following potentials to the conductors of the screen:

HV to those row conductors now indicated as needing to be enabled,

HV/2 to all other row conductors, zero potential to CC2,

HV/2 to all remaining column conductors CC1, CC3 to CC80

(iii) step on the CHARACTER GENERATORS one place and simultaneously apply the following potentials to the conductors of the screen:

HV to those row conductors now indicated as needing to be enabled,

HV/2 to all other row conductors, zero potential to CC3,

HV/2 to all remaining column conductors CC1, CC2, CC4 to CC80.

(iv) step on the CHARACTER GENERATORS one place and simultaneously apply the following potentials to the conductors of the screen:

HV to those row conductors now indicated as needing to be enabled,

HV/2 to all other row conductors, zero potential to CC4,

HV/2 to all remaining column conductors CC1, CC2, CC3, CC5 to CC80.

(v) step on the CHARACTER GENERATORS to their fifth and final place and simultaneously apply the following potentials to the conductors of the screen:

HV to those row conductors now indicated as needing to be enabled,

HV/2 to all other row conductors, zero potential to CC5,

HV/2 to all remaining column conductors CC1, CC2, CC3, CC4, CC6 to CC80.

Where a potential difference of HV exists between a row conductor and a column conductor the phosphor dot at the intersection of the two conductors in question emits light. The period for which the potential difference HV exists is controlled by the BRIGHTNESS CONTROL 28. Where the potential difference is merely HV/2 (HV − HV/2 or HV/2 − O) there is zero or negligible light emission.

The five steps (i) to (v) are repeated after transferring the B, E, H, K instructions into the ADDRESS LATCHES but the column conductors set in turn to zero potential are this time CC6 to CC10.

The next five steps are, of course, the scanning of the column conductors CC11 to CC 15 applying the C, F, I, L data to the row conductors.

The scan continues in a similar manner for the remaining column conductors CC 16 to CC 80 and the whole cycle is then recommenced with CC1.

The odd column conductors CC1, CC3, CC5 . . . etc. are, as explained earlier, connected to one of the COLUMN DRIVERS whereas the even column conductors are connected to the other COLUMN DRIVER. In scanning the column conductors there is therefore an alternation between COLUMN DRIVERS A and B under control of the A/B DRIVER SELECTOR 30.

FIG. 4 shows the detailed circuit of the line receiver 54. The line receiver comprises a type 75107 integrated circuit which provides separate line - receive facilities for the clock input 56 and the data input 57. The 1y and 2y outputs are connected respectively to the synchronisation generator 27 and the ADDRESS REGISTERS 1 to 4. The 1y output is, of course, the output corresponding to the data input 57, and the 2y output that corresponding to the clock input 56.

FIG. 5 shows the detailed circuit of the synchronisation generator 27 which comprises a type 74123 integrated circuit which contains two monostable multivibrators. The 2Q output and the input from the line receiver 54 are combined in an OR gate 58 for application to the demultiplexer 52, the counter circuits 53 and 29, the A/B DRIVER SELECTOR 30, the column scan generator 26 and the character scan generator 43. The output of the OR gate 58 is inverted by an inverter 59 for application to the counter circuits 53 and 29, the character scan generator 43 and the column scan generator 26. The 1Q output is used for the counter circuits 53 and 26, the A/B driver selector 30 and the column scan generator 26 and is inverted by an inverter 60 for application to the counter circuit 29.

FIG. 5A shows waveforms pertaining to the circuit of FIG. 5. Waveform (i) is the clock signal received by the SYNC GENERATOR from the LINE RECEIVER, the omitted 513th pulse is indicated by a dotted outline. Waveform (ii) shows the 1Q output of the SYNC GENERATOR and from which it will be seen that the monostable period is just less than the clock period. Waveform (iii) shows the 1Q output of the SYNC GENERATOR which is used to trigger the second monostable multivibrator within the SYNC GENERATOR. Waveform shows the 2Q output of the SYNC GENERATOR and from which it can be seen that the monostable period is approximately one half the clock period. Waveform (v) is the output of OR gate 58 comprising waveform (i) OR waveform (iv).

The output of OR gate 58 is thus a continuous train of clock pulses (that is, the omitted pulse is inserted by the SYNC GENERATOR). The output of inverter 59 is, of course, the continuous clock train inverted.

The 1Q output of the SYNC GENERATOR is a negative-going synchronisation pulse (the negative going spikes in waveform (ii) are of too short a duration to be significant). The output of inverter 60 is, of course, a positive-going synchronisation pulse.

FIG. 6 shows the detailed circuit of the COUNTER CIRCUIT

53 which comprises a J-K flip-flop 61, a type 74163 integrated circuit which is a synchronous 4-bit binary counter, an AND gate 62, and a NOR gate 63. The output of OR gate 58 is applied to the clock input of flip-flop 61, the J and K inputs are commonly connected to a supply potential $V_{RA}$, and the 1Q output of the SYNCHRONISATION GENERATOR 27 is used to clear the flip-flop. The flip-flop 61 performs a divide-by-two function on the clock waveform from the SYNCHRONISATION GENERATOR and its Q output is connected to AND gate 62, and the ENABLE P input of the 74163 integrated circuit of the counter circuit 53.

The output of inverter 59 is connected to the clock input of the 74163 integrated circuit of COUNTER CIRCUIT 53 and its carry output is connected to the AND gate 62 whose output is connected to both inputs of the NOR gate 63. The QC and QD outputs of the integrated circuit are used as inputs to the DEMULTIPLEXOR 52 which controls the clocking of the REGISTERS 48 to 51. The output of NOR gate 63 is used to control the transfer of data from the REGISTERS 48 to 51 to the LATCHES 44 to 47.

FIG. 6A shows waveforms pertaining to the circuit of FIG. 6. Waveform (vi) is the negative-going synchronisation waveform (ii) (FIG. 5A) with the negative-going spikes not shown. Waveform (vi) is used to CLEAR the FIRST COUNTER CIRCUIT 53. Waveform (vii) is the Q output of the JK flip-flop 61 used to ENABLE the FIRST COUNTER CIRCUIT 53. Waveform (viii) is waveform (v) of FIG. 5A inverted, that is, it is the inverted continuous clock signal and is applied to CLOCK the FIRST COUNTER CIRCUIT 53. The five waveforms (ix) are the QA, QB, QC, QD and CARRY outputs of the FIRST COUNTER CIRCUIT 53. The CARRY output, it should be noted lasts for two clock pulses because of the use of the JK flip-flop 61 to ENABLE the FIRST COUNTER CIRCUIT 53.

The detailed circuit of the DEMULTIPLEXOR 52 is shown in FIG. 7 and comprises a type 74139 integrated circuit with outputs taken from its 2y0, 2y1, 2y2, and 2y3 outputs to the registers 48 to 51.

FIG. 7A shows waveforms pertaining to the circuit of FIG. 7. Waveform (x) is the negative-going synchronisation signal. Waveform (xi) is the non-inverted continuous clock signal (waveform (v) of FIG. 5A) and is used to enable the DEMULTIPLEXOR 52. The type 74139 integrated circuit contains two demultiplexor circuits but only one of the circuits is actually used. Waveforms (xii) are the QD and QC outputs of the FIRST COUNTER CIRCUIT 53 used the SELECT the output line of the DEMULTIPLEXOR 52. Waveforms (xiii) are the 2y0, 2y1, 2y2, and 2y3 outputs the 74139 integrated circuit of the DEMULTIPLEXOR 52, each controls the entry of data into a respective one of the ADDRESS REGISTERS. It will be seen that the waveforms (xiii) are such that eight bits are entered serially into each ADDRESS REGISTER in turn.

Figure 8B:
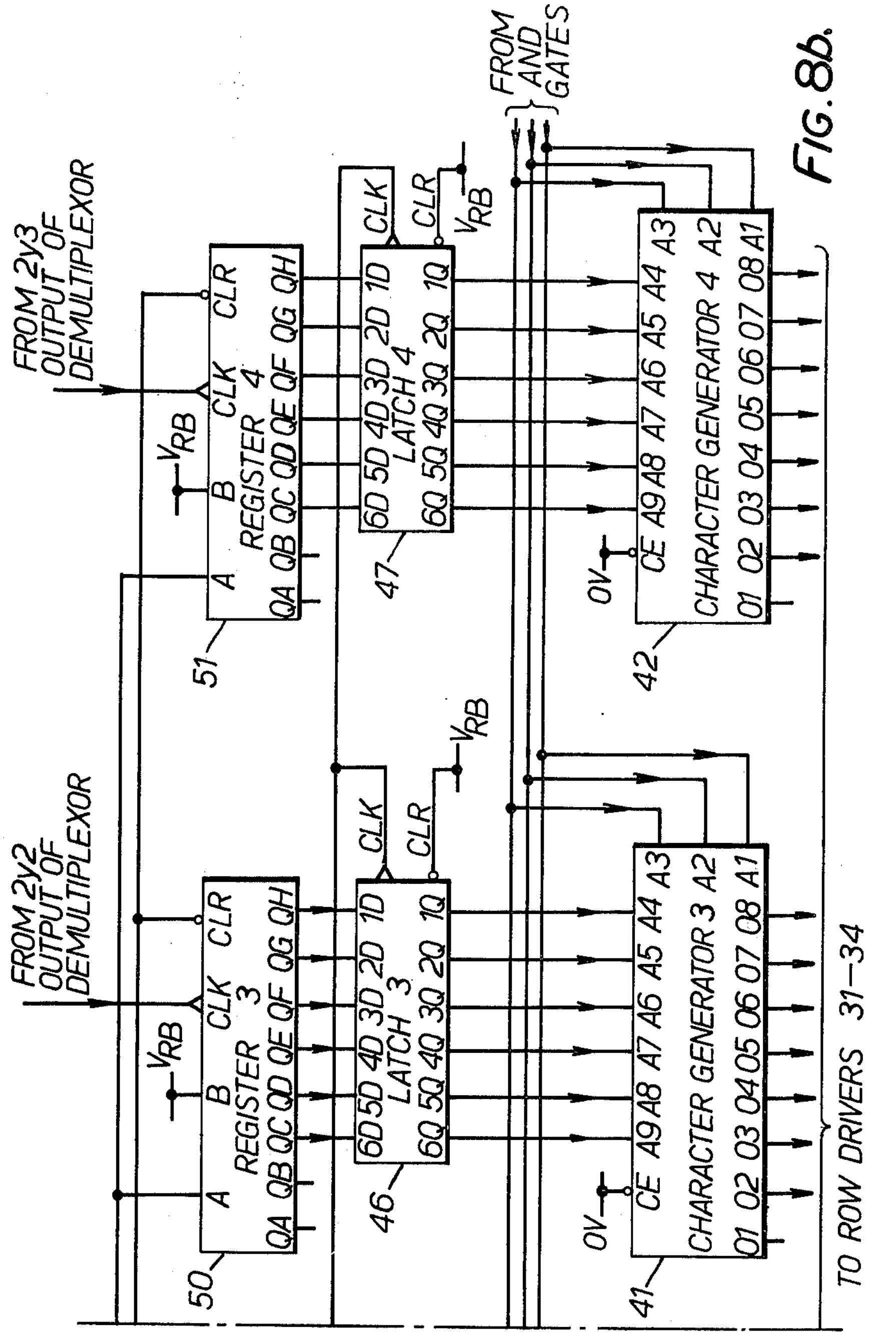

FIG. 8 shows the detailed circuits of the ADDRESS REGISTERS 48 to 51, the ADDRESS LATCHES 44 to 47, and the CHARACTER GENERATORS 39 to 42.

Each ADDRESS REGISTER is a type 74164 integrated circuit 8-bit parallel output, serial input shift register.

Each ADDRESS LATCH is a type 74174 hex latch integrated circuit.

Each CHARACTER GENERATOR is a type 2516 integrated circuit.

As explained, the ADDRESS REGISTERS 48 to 51 are serially loaded with one word from the input data so that each ADDRESS REGISTER contains a respective byte. The loaded characteridentifying data is then transferred to the ADDRESS LATCHES 44 to 47 which control the CHARACTER GENERATORS 39 to 42. While the CHARACTER GENERATORS 39 to 42 are producing the requisite signals to generate the characters whose identities are stored in the ADDRESS LATCHES, a fresh word of input data is being entered into the ADDRESS REGISTERS 48 to 51. At the same time, of course, the column conductors of the display matrix 21 are being scanned in synchronism with the outputs of the CHARACTER GENERATORS so that the characters appear in their correct positions on the display matrix. Each character is formed from a 7 × 5 matrix of dots and each CHARACTER GENERATOR produces serially five bytes, each byte being an eight-bit-parallel output. The circuit which steps the CHARACTER GENERATORS on one place to give each of these five output bytes is the CHARACTER SCAN GENERATOR shown in FIG. 11.

The detailed circuit of the ROW DRIVERS 31 to 34 and the POWER SUPPLIES 35 to 38 is shown in FIG. 9. Each ROW DRIVER comprises seven identical driver stages 64 of which only one is shown in detail. Each driver stage 64 comprises a PNP switching transistor 65 having its emitter connected to a respective output of the associated one of the CHARACTER GENERATORS 39 to 42 and its base connected to receive a stabilised supply of 3.3V from an associated one of the POWER SUPPLIES 35 to 38. The collector of the transistor 65 is connected to one end of a resistor 66, the other end of which is connected to one end of another resistor 67, to the base of another PNP switching transistor 68 and to the base of an NPN switching transistor 69. The other end of the resistor 67 is connected to a supply rail of potential +HV as also is the collector of transistor 68. The collector of transistor 64 is connected to a supply rail of potential +HV/2 and the emitters of transistors 68 and 69 are commonly connected to an associated one of the row conductors of the matrix 21.

The transistor 65 will turn ON when the potential at its emitter from the associated CHARACTER GENERATOR is OV and will turn OFF when the potential is the positive output potential of the CHARACTER GENERATOR. Thus, the transistor 65 in the several driver stages 64 are turned ON or OFF according to the CHARACTER GENERATOR outputs which respresent parts of the characters to be generated.

When a transistor 65 is ON the potential at its collector will be a low positive voltage and when the transistor is OFF the potential will be +HV. The potential at the junctions of resistors 66 and 67 is a low positive voltage when transistor 65 is ON and is equal to +HV when transistor 65 is OFF.

The column conductors of the display matrix 21 are all but one at a potential of +HV/2, the one exception being at zero potential. The identity of the conductor at zero potential changes, of course, with time to provide a scan of the matrix 21. Each row conductor is therefore connected through seventy-nine phosphor dots to a potential of +HV/2 and through one phosphor dot to zero potential. This means that each row conductor is in effect resistively and capacitively coupled to a potential of +HV/2. It therefore follows that when the potential at the junction of resistors 66 and 67 has its high value (transistor 65 OFF) transistor 68 is ON and transistor 69 is OFF, and that when the potential at the junction is low (transistor 65 ON) transistor 68 is OFF and transistor 69 is ON. Transistors 68 and 69 thus constitute a complementary switching pair and serve to apply to the associated row conductor a potential of either +HV or +HV/2 according as to whether transistor 65 is OFF or ON respectively.

Each of the POWER SUPPLIES 35 to 38 comprises a 1 kilohm resistor 70 having one end connected to a +5v power supply rail and its other end connected to the cathode of a 3.3v zener diode 71 and to one end of a 47 nanofarad capacitor 72. The anode of the zener diode 71 and the other end of the capacitor 72 are connected to a supply rail at zero potential. The output of each POWER SUPPLY 35 to 38 is taken from the cathode of its zener diode 71. It will be noted that POWER SUPPLY A supplies odd row driver stages 64 in ROW DRIVERS 31 and 32 whereas POWER SUPPLY B supplies even row driver stages in ROW DRIVERS 31 and 32. A similar arrangement exists for POWER SUPPLIES C and D in respect of ROW DRIVERS 33 and 34.

Those skilled in the art will know that cross-talk and the largely capacitive nature of the load are problems which cause difficulty in the design of display apparatus using an electroluminescent display matrix. The present use of several power supply circuits and complementary driver circuits results in the apparatus overcoming these problems to a large extent.

The detailed circuit of the SECOND COUNTER CIRCUIT 29 is shown in FIG. 10 and comprises a type 74163 integrated circuit (a synchronous four-bit binary counter). The carry output of the FIRST COUNTER CIRCUIT 27 is connected to the input of an inverter 73 the output of which is connected to the ENABLE P and ENABLE T inputs of the 74163 integrated circuit of the SECOND COUNTER CIRCUIT 29.

The output of the inverter 60 of the SYNC GENERATOR 27 is connected to one input of a NOR gate 74 and to one input of an OR gate 75. The carry output of the 74163 integrated circuit of the SECOND COUNTER CIRCUIT is connected to the other input of the NOR gate 74 and the output of gate 74 is connected to the LOAD input of the integrated circuit of the SECOND COUNTER CIRCUIT.

The $Q_A$ and $Q_B$ outputs of the 74163 integrated circuit of the SECOND COUNTER CIRCUIT are connected as inputs to an AND gate 76, and the Qc output is connected to one input of an AND gate 77 and to a pole 78 of a switch 79. The output of AND gate 76 is connected through an inverter 80 to the other input of AND gate 77. A second pole 81 of the switch 79 is connected to the output of the AND gate 77 and a third pole 82 is connected to the output of inverter 74. The wiper of switch 79 is connected to the input of an inverter 83, the output of which is connected to the other input of the OR gate 75.

The carry output of the FIRST COUNTER CIRCUIT 27 is connected to one input of an inverter 84, the other input of which is taken from the output of the OR gate 75.

The 74163 integrated circuit of the SECOND COUNTER CIRCUIT is used to perform two functions, firstly a divide-by-six function and secondly to provide a number of outputs which are combined by the logic gates associated with the switch 79. The divide-by-six function is required in order to step on the CHARACTER GENERATORS one place at the correct instants, the CHARACTER SCAN GENERATOR acting as an interface between the SECOND COUNTER CIRCUIT and the CHARACTER GENERATORS.

FIG. 10A shows waveforms pertaining to the circuit of FIG. 10. Waveform (xiv) is a positive-going synchronisation signal produced by the inversion of the negative-going synchronisation signal by inverter 60. Waveform (xvi) is the waveform occurring at the LOAD input of the integrated circuit of the SECOND COUNTER CIRCUIT. Waveform (xvii) is the inversion of the CARRY output of the FIRST COUNTER CIRCUIT and is used to ENABLE the integrated circuit of the SECOND COUNTER CIRCUIT. Waveforms (xviii) are the QA, QB, QC, and QD outputs of the integrated circuit of the SECOND COUNTER CIRCUIT. The QA, QB, and QC waveforms are logically combined in several ways and one logical combination selected by the switch 79. Waveform (xix) is the CARRY output of the integrated circuit of the SECOND COUNTER CIRCUIT and is divided-by-six relationship to the clock waveform (xv).

Waveform (xx) shows the output of the AND gate 76 and waveform (xxi) shows its inversion. The logical combination of the QC output and waveform (xxi) by gate 77 produces the waveform (xxii) at the pole 81 of the switch 79. Waveform (xxiii) is a repeat of waveform (xviii) and is the waveform at the pole 78 of the switch 79. Waveform (xxiv) is a repeat of waveform (xvi) and is the waveform at the pole 82 of the switch 79. The switch 79 selects one of the waveforms (xxii), (xxiii), (xxiv) and the time for which the screen emits light is made to correspond to the mark periods of the selected waveforms (of course, an arrangement in which the space periods were used could alternatively be devised). It will be noted that waveforms (xxii), (xxiii) have low, medium and high duty cycles respectively and therefore correspond to low, medium and high brightness levels. Switch 79 and its associated components thus constitutes the BRIGHTNESS CONTROL.

FIG. 11 shows the detailed circuit of the CHARACTER SCAN GENERATOR which comprises a type 74163 integrated circuit and several logic gates. As explained earlier, the type 74163 integrated circuit is a bistable counter and it is used in the CHARACTER SCAN GENERATOR to generate address codes for application to the CHARACTER GENERATORS.

A NOR gate 85 receives the positive-going synchronisation signal and the CARRY output of the integrated circuit of the CHARACTER SCAN GENERATOR and its output is connected to the LOAD input of the said integrated circuit. The inverted continuous clock signal is applied to the CLOCK input of the integrated circuit of the CHARACTER SCAN GENERATOR and the CARRY output of the SECOND COUNTER CIRCUIT is connected to the ENABLE P and T inputs.

The $Q_B$ and $Q_C$ outputs of the integrated circuit of the CHARACTER SCAN GENERATOR are combined in an AND gate 86, and the QB output is inverted by an inverter 87. The $Q_A$ output of the integrated circuit of the CHARACTER SCAN GENERATOR is connected to one input of an AND gate 88, the output of inverter 87 to one input of an AND gate 89, and the output of AND gate 86 to one input of an AND gate 90. The other inputs of the AND gates 88, 89, 90 are commonly connected to the output from inverter 84 of the BRIGHTNESS CONTROL. The effect of the AND gates 88, 89, 90 is to prevent the CHARACTER GENERATORS being addressed at times when (i) there is a CARRY output from the FIRST COUNTER CIRCUIT, or (ii) the signal at the wiper of switch 79 is at 0 level, or (iii) there is a sync-pulse. The AND gates 88, 89, 90 thus carry out a blanking function.

FIG. 11A shows waveforms pertaining to the circuit of FIG. 11. Waveforms (xxv) shows the QA, QB, and QC outputs of the integrated circuit of the CHARACTER SCAN GENERATOR. Waveforms (xxvi) show the address waveforms derived from waveforms (xxv) by the gate 86 and 87. The outputs of gates 86 and 87 taken with the $Q_A$ output of the integrated circuit of the CHARACTER SCAN GENERATOR repeatedly count from one to five in binary rotation.

FIG. 12 shows the detailed circuits of the A/B DRIVER SELECTOR and the COLUMN SCAN GENERATOR.

The COLUMN SCAN GENERATOR comprises a type 74162 integrated circuit and a type 74163 integrated circuit. The type 74162 integrated circuit is a synchronous decade counter and is used to perform a divide-by-ten function. The type 74163 integrated circuit of the COLUMN SCAN GENERATOR performs a divide-by-four function. Both integrated circuits of the COLUMN SCAN GENERATOR are clocked by the inverted continuous clock signal. The negative-going synchronisation signal is connected to the LOAD inputs of the two integrated circuits.

The divide-by-four counter (type 74163 integrated circuit) of the COLUMN SCAN GENERATOR has the CARRY output of the divide-by-ten counter (the type 74162 integrated circuit) connected to its ENABLE P input.

The A/B DRIVER SELECTOR comprises a JK flip-flop 91 which is clocked by the non-inverted continuous clock signal from the SYNC GENERATOR. The negative-going synchronisation signal is connected to the CLEAR input of flip-flop 91 and the JK inputs are commonly connected to the CARRY output of the SECOND COUNTER CIRCUIT. An output is taken from the inverted output of the JK flip-flop 91 to one input of an AND gate 92. The other input of the AND gate is connected to the CARRY output of the SECOND COUNTER CIRCUIT.

The output of the AND gate 92 is used to ENABLE the divide-by-ten counter on alternate CARRY outputs from the SECOND COUNTER CIRCUIT.

The purpose of the COLUMN SCAN GENERATOR is to cause the scan of the column conductors to advance one column with each pulse from the CARRY output of the SECOND COUNTER CIRCUIT.

The flip-flop 91 changes state at the occurrence of each CARRY output from the SECOND COUNTER CIRCUIT. One state of the flip-flop 91 causes the COLUMN DRIVER A to be selected, the other state causes the COLUMN DRIVER B to be selected. The flip-flop 91 thus performs a divide-by-two function on the CARRY outputs of the SECOND COUNTER CIRCUIT.

The COLUMN SCAN GENERATOR counts from one to forty, advancing one count each time a CARRY output occurs from the SECOND COUNTER CIRCUIT occurs. In combination with the alternate selection of A and B COLUMN DRIVERS, this effectively gives a one to eighty count, eighty being the number of column conductors.

The output of the inverter 83 is combined with the QC and QD outputs of the type 74162 integrated circuit of the COLUMN SCAN GENERATOR to perform a brightness control blanking function on the column energization. For this purpose, respective OR gates 93 and 94 are connected to the QC and QD outputs of the type 74162 integrated circuit. The outputs of the gates 93 and 94 are taken to ENABLE inputs in the COLUMN DEMULTIPLEXOR, FIG. 13 shows the detailed circuits of the COLUMN DEMULTIPLEXORS 24, 25 and the COLUMN DRIVERS 22, 23. The block diagram, FIG. 1, is somewhat simplified, in that it shows the COLUMN DEMULTIPLEXORS A and B as distinct entities, in fact the A and B demultiplexing is carried out in both of two demultiplexors 95 and 96. Each demultiplexor 95, 96 is a type 74155 integrated circuit.

Each COLUMN DRIVER comprises four identical decoders, each a type SN 74141 integrated circuit. The decoders of COLUMN DRIVER A are referenced 97, 98, 99, 100 and those of COLUMN DRIVER B are referenced 101, 102, 103, 104. Each decoder has four inputs lines for address data (ABCD) and eight output lines (0 to 8). The output lines are at a potential HV/2 except for the output line addressed which is at substantially zero potential. The following table gives the relationship between the address codes and the output lines addressed:

| Address code DCBA | Output Line addressed |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | * |
| 1011 | * |
| 1100 | * |
| 1101 | * |
| 1110 | * |
| 1111 | * |

* = no output on any line, all lines at potential $HV_{/2}$

The demultiplexor 95 is used to direct the C digit of the address codes to a particular decoder and the demultiplexor 96 is used to direct the D digit to the same decoder at the time in question. The A and B digits of the address codes are generated by the type 74162 divide-by-ten counter of the COLUMN SCAN GENERATOR and applied directly to all the decoders 97 to 104. The C and D digits of the address codes are also generated by the divide-by-ten counter but are not applied directly to the decoders. The C digit address input of each decoder 97 to 104 is connected to a respective output line of the demultiplexor 95. The D digit address input of each decoder 97 to 104 is connected to a respective output line of the demultiplexor 96. The outputs of the divide-by-four counter of the COLUMN SCAN GENERATOR and the output of the flip-flop 91 are used to control the addressing of output lines of the demultiplexors 95 and 96. The operation of each of the demultiplexors 95 and 96 is expressed in the following table:

| INPUTS | | | | OUTPUTS | | | | | | | |
|---|---|---|---|---|---|---|---|---|---|---|---|
| A | B | 1C 2C | 1G 2G | 1y0 | 1y1 | 1y2 | 1y3 | 2y0 | 2y1 | 2y2 | 2y3 |
| 0 | 0 | 1 | 0 | 0 | 1 | 1 | 1 | 1 | 1 | 1 | 1 |
| 0 | 0 | 0 | 0 | 1 | 1 | 1 | 1 | 0 | 1 | 1 | 1 |
| 0 | 1 | 1 | 0 | 1 | 0 | 1 | 1 | 1 | 1 | 1 | 1 |
| 0 | 1 | 0 | 0 | 1 | 1 | 1 | 1 | 1 | 0 | 1 | 1 |
| 1 | 0 | 1 | 0 | 1 | 1 | 0 | 1 | 1 | 1 | 1 | 1 |
| 1 | 0 | 0 | 0 | 1 | 1 | 1 | 1 | 1 | 1 | 0 | 1 |
| 1 | 1 | 1 | 0 | 1 | 1 | 1 | 0 | 1 | 1 | 1 | 1 |
| 1 | 1 | 0 | 0 | 1 | 1 | 1 | 1 | 1 | 1 | 1 | 0 |
| X | X | X | 1 | 1 | 1 | 1 | 1 | 1 | 1 | 1 | 1 |

X = irrelevant whether 0 or 1.

The next table gives a part of the logical sequence which produces a scan of the column conductors.

| D Demultiplexor 96 | | | | | | | | C Demultiplexor 95 | | | | | | | | AB Code | | Column Conductor at zero potential | Decoder used |
|---|---|---|---|---|---|---|---|---|---|---|---|---|---|---|---|---|---|---|---|
| 1y0 | 1y1 | 1y2 | 1y3 | 2y0 | 2y1 | 2y2 | 2y3 | 1y0 | 1y1 | 1y2 | 1y3 | 2y0 | 2y1 | 2y2 | 2y3 | A | B | | |
| 0 | 1 | 1 | 1 | 1 | 1 | 1 | 1 | 0 | 1 | 1 | 1 | 1 | 1 | 1 | 1 | 0 | 0 | CC1 | 97 |
| 1 | 1 | 1 | 1 | 0 | 1 | 1 | 1 | 1 | 1 | 1 | 1 | 0 | 1 | 1 | 1 | 0 | 0 | CC2 | 101 |
| 0 | 1 | 1 | 1 | 1 | 1 | 1 | 1 | 0 | 1 | 1 | 1 | 1 | 1 | 1 | 1 | 0 | 1 | CC3 | 97 |
| 1 | 1 | 1 | 1 | 0 | 1 | 1 | 1 | 1 | 1 | 1 | 1 | 0 | 1 | 1 | 1 | 0 | 1 | CC4 | 101 |
| 0 | 1 | 1 | 1 | 1 | 1 | 1 | 1 | 0 | 1 | 1 | 1 | 1 | 1 | 1 | 1 | 1 | 0 | CC5 | 97 |
| 1 | 1 | 1 | 1 | 0 | 1 | 1 | 1 | 1 | 1 | 1 | 1 | 0 | 1 | 1 | 1 | 1 | 0 | CC6 | 101 |
| 0 | 1 | 1 | 1 | 1 | 1 | 1 | 1 | 0 | 1 | 1 | 1 | 1 | 1 | 1 | 1 | 1 | 1 | CC7 | 97 |
| 1 | 1 | 1 | 1 | 0 | 1 | 1 | 1 | 1 | 1 | 1 | 1 | 0 | 1 | 1 | 1 | 1 | 1 | CC8 | 101 |
| 0 | 1 | 1 | 1 | 1 | 1 | 1 | 1 | 1 | 1 | 1 | 1 | 1 | 1 | 1 | 1 | 0 | 0 | CC9 | 97 |
| 1 | 1 | 1 | 1 | 0 | 1 | 1 | 1 | 1 | 1 | 1 | 1 | 1 | 1 | 1 | 1 | 0 | 0 | CC10 | 101 |
| 0 | 1 | 1 | 1 | 1 | 1 | 1 | 1 | 1 | 1 | 1 | 1 | 1 | 1 | 1 | 1 | 0 | 1 | CC11 | 97 |
| 1 | 1 | 1 | 1 | 0 | 1 | 1 | 1 | 1 | 1 | 1 | 1 | 1 | 1 | 1 | 1 | 0 | 1 | CC12 | 101 |
| 0 | 1 | 1 | 1 | 1 | 1 | 1 | 1 | 1 | 1 | 1 | 1 | 1 | 1 | 1 | 1 | 1 | 0 | CC13 | 97 |
| 1 | 1 | 1 | 1 | 0 | 1 | 1 | 1 | 1 | 1 | 1 | 1 | 1 | 1 | 1 | 1 | 1 | 0 | CC14 | 101 |
| 0 | 1 | 1 | 1 | 1 | 1 | 1 | 1 | 1 | 1 | 1 | 1 | 1 | 1 | 1 | 1 | 1 | 1 | CC15 | 97 |
| 1 | 1 | 1 | 1 | 0 | 1 | 1 | 1 | 1 | 1 | 1 | 1 | 1 | 1 | 1 | 1 | 1 | 1 | CC16 | 101 |
| 1 | 0 | 1 | 1 | 1 | 1 | 1 | 1 | 1 | 0 | 1 | 1 | 1 | 1 | 1 | 1 | 0 | 0 | CC17 | 98 |
| 1 | 1 | 1 | 1 | 1 | 0 | 1 | 1 | 1 | 1 | 1 | 1 | 1 | 0 | 1 | 1 | 0 | 0 | CC18 | 102 |
| 1 | 0 | 1 | 1 | 1 | 1 | 1 | 1 | 1 | 0 | 1 | 1 | 1 | 1 | 1 | 1 | 0 | 1 | CC19 | 98 |
| 1 | 1 | 1 | 1 | 1 | 0 | 1 | 1 | 1 | 1 | 1 | 1 | 1 | 0 | 1 | 1 | 0 | 1 | CC20 | 102 |
| 1 | 0 | 1 | 1 | 1 | 1 | 1 | 1 | 1 | 0 | 1 | 1 | 1 | 1 | 1 | 1 | 1 | 0 | CC21 | 98 |
| 1 | 1 | 1 | 1 | 1 | 0 | 1 | 1 | 1 | 1 | 1 | 1 | 1 | 0 | 1 | 1 | 1 | 0 | CC22 | 102 |
| 1 | 0 | 1 | 1 | 1 | 1 | 1 | 1 | 1 | 0 | 1 | 1 | 1 | 1 | 1 | 1 | 1 | 1 | CC23 | 98 |
| 1 | 1 | 1 | 1 | 1 | 0 | 1 | 1 | 1 | 1 | 1 | 1 | 1 | 0 | 1 | 1 | 1 | 1 | CC24 | 102 |
| 1 | 0 | 1 | 1 | 1 | 1 | 1 | 1 | 1 | 1 | 1 | 1 | 1 | 1 | 1 | 1 | 0 | 0 | CC25 | 98 |
| 1 | 1 | 1 | 1 | 1 | 0 | 1 | 1 | 1 | 1 | 1 | 1 | 1 | 1 | 1 | 1 | 0 | 0 | CC26 | 102 |
| 1 | 0 | 1 | 1 | 1 | 1 | 1 | 1 | 1 | 1 | 1 | 1 | 1 | 1 | 1 | 1 | 0 | 1 | CC27 | 98 |
| 1 | 1 | 1 | 1 | 1 | 0 | 1 | 1 | 1 | 1 | 1 | 1 | 1 | 1 | 1 | 1 | 0 | 1 | CC28 | 102 |
| 1 | 0 | 1 | 1 | 1 | 1 | 1 | 1 | 1 | 1 | 1 | 1 | 1 | 1 | 1 | 1 | 1 | 0 | CC29 | 98 |
| 1 | 1 | 1 | 1 | 1 | 0 | 1 | 1 | 1 | 1 | 1 | 1 | 1 | 1 | 1 | 1 | 1 | 0 | CC30 | 102 |
| 1 | 0 | 1 | 1 | 1 | 1 | 1 | 1 | 1 | 1 | 1 | 1 | 1 | 1 | 1 | 1 | 1 | 1 | CC31 | 98 |
| 1 | 1 | 1 | 1 | 1 | 0 | 1 | 1 | 1 | 1 | 1 | 1 | 1 | 1 | 1 | 1 | 1 | 1 | CC32 | 102 |
| 1 | 1 | 0 | 1 | 1 | 1 | 1 | 1 | 1 | 1 | 0 | 1 | 1 | 1 | 1 | 1 | 0 | 0 | CC33 | 99 |
| 1 | 1 | 1 | 1 | 1 | 1 | 0 | 1 | 1 | 1 | 1 | 1 | 1 | 1 | 0 | 1 | 0 | 0 | CC34 | 103 |
| 1 | 1 | 0 | 1 | 1 | 1 | 1 | 1 | 1 | 1 | 0 | 1 | 1 | 1 | 1 | 1 | 0 | 1 | CC35 | 99 |
| | | | | | | | | | | and so on to | | | | | | | | | |
| 1 | 1 | 1 | 0 | 1 | 1 | 1 | 1 | 1 | 1 | 1 | 1 | 1 | 1 | 1 | 1 | 1 | 1 | CC79 | 100 |
| 1 | 1 | 1 | 1 | 1 | 1 | 1 | 0 | 1 | 1 | 1 | 1 | 1 | 1 | 1 | 1 | 1 | 1 | CC80 | 104 |

The COLUMN SCAN GENERATOR and the A/B DRIVER SELECTOR have outputs such that the sequence of events expressed in the above table takes place repeatedly. It will readily be seen from the table how decoders in one and the other COLUMN DRIVERS are addressed alternately. As explained, this use of two COLUMN DRIVERS provides a considerable advantage in the physical layout of the wiring. Not only does it alleviate the problem of high connection density at the matrix but it also enables driver components to be grouped both above and below the matrix on a printed circuit board. This results in a generally flat configuration with compact layout.

An alternative arrangement alleviating the problem of high connection density still further is to use four COLUMN DRIVERS, say, A', B', C', D' with COLUMN DRIVER A' located at the top and behind the matrix, COLUMN DRIVER B' located at the bottom and behind the matrix, COLUMN DRIVER C' located at the top and in front of the matrix, and COLUMN DRIVER D' located at the bottom and in front of the matrix. With this arrangement a divide-by-four A'/B'/C'/D' DRIVER SELECTOR is used instead of the divide-by-two A/B DRIVER SELECTOR 30. A diagrammatic illustration of this alternative arrangement is given in FIG. 15 (in particular it should be noted that no attempt has been made to depict the usual "dual in-line" layout of the integrated circuits). It will be seen that, using the nomenclature already given, CC1, CC5, CC9 . . . are connected to COLUMN DRIVER A', CC2, CC6, CC10 . . . to COLUMN DRIVER B', CC3, CC7, CC11 . . . to COLUMN DRIVER C', and CC4, CC8, CC12 . . . to COLUMN DRIVER D'. Theoretically, any number of COLUMN DRIVERS can be employed although practically, of course, there comes a stage where the problems introduced by the positioning and wiring of a large number of COLUMN DRIVERS overtakes the problem of the connection density of the column conductors. Where *n* COLUMN DRIVERS are provided (*n* being an integer), every *j*th column conductor out of *n* is connected to the *j*th COLUMN DRIVER ($j = 1, 2, 3 \ldots$ etc. . . . . . . $n$). The *n* COLUMN DRIVERS are, of course, addressed in sequence and this can conveniently be done by employing a divide-by-*n* circuit in place of the divide-by-two A/B DRIVER SELECTOR. Any other method of sequentially addressing the COLUMN DRIVERS can, of course, be employed.

Those skilled in the art will known that the type SN 74141 integrated circuits used for the decoders 97 to 104 are designed to drive cold-cathode indicator tubes directly. The present method of addressing by applying a potential of +HV/2 to all column conductors except one, which receives substantially zero volts, and by applying a potential of +HV/2 to all row conductors except selected ones, which receive + HV, enables the type SN 74141 integrated circuits to be applied to driving a dc-responsive phosphor-dot matrix. By this means, the advantage of using a widely available commercial product is gained together with the inherent advantages of integrated circuits.

Switching between (+HV/2) and substantially zero volts is achieved by connecting each output line of the decoders 97 to 104 through a respective 3.3 kilohm resistor 105 to a power supply rail of potential +HV/2.

The column conductors are connected directly to respective output lines of the decoders 97 to 104.

FIG. 14 shows details of the POWER SUPPLY 55. An incoming supply of +5V is apply to a parallel arrangement of transient-removing and smoothing capacitors 106. A voltage $V_{RA}$ used for setting logic inputs in several of the integrated circuits already described is derived by means of a series connected 1 kilohm resistor. The loading of counters with predetermined inputs has not been described in detail because those skilled in the art will be familiar with this technique. The voltage $V_{RA}$ represents, of course, logic 1 and zero volts logic 0. A voltage $V_{RB}$ used for CLEAR inputs of the ADDRESS LATCHES is also derived by using a 1 kilohm resistor.

An incoming supply of −SV is similarly connected to a capacitive filter and is then used (connections not shown) to supply the SYNC GENERATOR and CHARACTER GENERATORS.

An incoming supply of +12V is similarly connected to a capacitive filter and is then used (connections not shown) to supply the CHARACTER GENERATORS.

Supplies of +HV and +HV/2 are also provided, where HV is in the range 90 to 140 volts.

The +5V and OV lines are used to power the integrated circuits. Throughout the specification the term 'ground' means the potential reference point in a circuit which if connected to earth would not disturb the operation of the circuit in any way. The voltages referred to in the specific description and claims are measured as potential differences relative to earth set at zero potential.

What is claimed is:

1. Display apparatus comprising:

a display screen having two transversely arranged sets of conductors with DC-responsive electroluminescent phosphor material adapted to emit light when stimulated merely by a unidirectional electrical signal proximate the sets of conductors, and connected to a DC drive means comprising:

first means to select one or more conductors of a first set and apply to the selected conductor or conductors a first unidirectional potential difference relative to ground potential whilst simultaneously holding the remaining conductors of the first set at a second unidirectional potential between ground potential and the first potential, and second means to select one or more conductors of a second set and apply to the selected conductor or conductors, at least partially coexistant with the application of the first and second potentials to the first set of conductors, substantially ground potential whilst holding the remaining conductors of the second set at a third unidirectional potential between ground potential and the first potential so that said material is activated only at crossings between said selected conductors of the first and second sets.

2. Apparatus as claimed in claim 1, wherein the third potential is equal to the second potential.

3. Apparatus as claimed in claim 1, wherein the difference between the second potential and ground is substantially one half of the difference between the first potential and ground.

4. Apparatus as claimed in claim 1, wherein said second means includes logic circuitry responsive to a train of clock pulses to cause the said conductors of the second set to be scanned by application of ground potential sequentially to each conductor in turn of the second set, and including third means to generate the first and second potentials comprising a step-up transformer arranged to receive the clock pulses at its primary and a rectifier circuit connected to the secondary of the transformer.

5. Apparatus as claimed in claim 1, wherein said first means includes a transistor switching circuit for each conductor of the first set, and each transistor switching circuit comprises a complementary pair transistor switch.

6. Apparatus as claimed in claim 5, wherein each complementary pair transistor switch comprises a transistor of one conductivity type having its collector connected to a source of the first potential and its emitter connected to the emitter of a transistor of the opposite conductivity type having its collector connected to a source of the second potential, the bases of the complementary pair transistors being connected in common and constituting the input of the circuit, the commoned emitters constituting the output of the circuit.

7. Apparatus as claimed in claim 5, wherein a respective input transistor is provided for each complementary pair transistor switch, each input transistor having its emitter arranged to receive an input, its base connected to a voltage source, and its collector connected to the input of its associated complementary pair transistor switch.

8. Apparatus as claimed in claim 7, wherein a plurality of voltage sources are provided for the bases of the input transistors, each voltage source being connected to the bases of a respective associated group of input transistors.

9. Apparatus as claimed in claim 8, wherein each voltage source for the bases of the input transistors comprises a respective zener diode circuit.

10. Apparatus as claimed in claim 1, wherein said second means includes logic circuitry responsive to a train of clock pulses to cause the said conductors of the second set to be scanned by application of ground potential sequentially to each conductor in turn of the second set, and a brightness control is provided comprising a parallel-output counter arranged to respond to the clock pulses, means to combine the outputs of the parallel-output counter logically in a plurality of different ways, each way providing an output waveform having a respective mark/space ratio, and means to select one of the logical combinations and to limit light-emission from the display screen to the mark or space period of the output waveform corresponding to the selected logical combination.

11. Display apparatus as claimed in claim 1, wherein the display screen is a rectangular matrix, the said first set of conductors being the rows of the matrix and the said second set of conductors being the columns of the matrix, said second means includes a plurality of semiconductor integrated circuit display drivers and wherein *n* column driver circuits are provided, *n* being an integer greater than one, each column driver circuit comprising a respective one at least of said semiconductor integrated circuit display drivers, every *j*th column conductor being connected to the *j*th column driver circuit, *j* taking the value of each in turn of the integers in the range 1 to *n* inclusive, and means are provided to address the column driver circuits sequentially.

12. Display apparatus as claimed in claim 1, wherein the display screen is a rectangular matrix, the said first set of conductors being the rows of the matrix and the said second set of conductors being the columns of the matrix, electrical connection to the column conductors is made alternately from opposite edges of the rectangular matrix, said second means includes logic circuitry responsive to a train of clock pulses to cause the said conductors of the second set to be scanned by application of ground potential sequentially to each conductor in turn of the second set, said logic circuitry comprises a counter circuit having its output connected to a demultiplexor circuit, the output of which is connected to the first means, and the means to address the column driver circuits sequentially comprises a divide-by- *n* circuit provided in the said counter circuit operative to cause the demultiplexor circuit to address the column driver circuits in sequence.

13. Display apparatus as claimed in claim 12, wherein *n* is two, the electrical connections to the column conductors from one edge of the screen are connected to one column driver circuit, the electrical connections to the column conductors from the opposite edge of the screen are connected to the other column driver circuit, and the divide-by-*n* circuit is a divide -by-two circuit operative to cause the demultiplexor circuit to address the column driver circuits alternately.

14. Display apparatus as claimed in claim 12, wherein *n* is four, the electrical connections to the column conductors from one edge of the screen are connected alternately to the first and third column driver circuits, and the electrical connections to the column conductors from the opposite edge of the screen are connected alternately to the second and fourth column driver circuits.

15. A method of addressing a display screen having transverse sets of conductors with DC -responsive electroluminescent phosphor material adapted to emit light when stimulated merely by a unidirectional electrical signal proximate the sets of conductors, the method comprising driving said screen in a DC mode by:

applying to one or more selected conductors of a first set a first unidirectional potential difference relative to ground potential, whilst simultaneously holding the remaining conductors of the first set at a second unidirectional potential between ground potential and the first potential, and applying to one or more selected conductors of a second set, at least partially co-existant with the application of the first and second potentials to the first set of conductors, substantially ground potential whilst holding the remaining conductors of the second set at a third unidirectional potential between ground potential and the first potential so that said material is activated only at crossings between said selected conductors of the first and second sets.

16. A method as claimed in claim 15, wherein the third potential is equal to the second potential.

17. A method as claimed in claim 15, wherein the difference between the second potential and ground is substantially one half of the difference between the first potential and ground.

* * * * *